United States Patent
Manolakos et al.

(10) Patent No.: US 12,041,560 B2
(45) Date of Patent: Jul. 16, 2024

(54) TIMELINE CONSIDERATIONS FOR CHANNEL STATE INFORMATION REPORTING OF A SIDELINK CHANNEL

(71) Applicant: QUALCOMM Incorporated, San Diego, CA (US)

(72) Inventors: Alexandros Manolakos, San Diego, CA (US); Seyedkianoush Hosseini, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 16/911,209

(22) Filed: Jun. 24, 2020

(65) Prior Publication Data

US 2021/0045074 A1    Feb. 11, 2021

(30) Foreign Application Priority Data

Aug. 6, 2019  (GR) .............................. 20190100336

(51) Int. Cl.
*H04W 16/14*  (2009.01)
*H04B 7/06*  (2006.01)
(Continued)

(52) U.S. Cl.
CPC ........ *H04W 56/001* (2013.01); *H04B 7/0626* (2013.01); *H04L 5/0051* (2013.01);
(Continued)

(58) Field of Classification Search
None
See application file for complete search history.

(56) References Cited

U.S. PATENT DOCUMENTS 9,723,603 B2 * 8/2017 Takeda .................. H04W 72/23
10,863,494 B2 * 12/2020 Zhang ..................... H04L 5/005
(Continued)

FOREIGN PATENT DOCUMENTS

CN    109565396 A    4/2019

OTHER PUBLICATIONS

Ericsson: "Details on CSIT Acquisition for SL Unicast", 3GPP Draft, 3GPP TSG-RAN WG1 Meeting #96, R1-1903175, Ericsson— Details on CSIT Acquisition for SL Unicast, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019 (Feb. 15, 2019), XP051600871, 7 pages, Retrieved from the Internet: URL: http://www.3gpp.org/ftp/tsg%5Fran/WG1%5FRL1/TSGR1%5F96/Docs/R1%2D1903175%2Ezip. [retrieved on Feb. 15, 2019] the whole document.
(Continued)

*Primary Examiner* — Sithu Ko
(74) *Attorney, Agent, or Firm* — Holland & Hart LLP

(57) ABSTRACT

Methods, systems, and devices for wireless communications are described. In some systems, a base station may update its channel state information (CSI) on a sidelink between a first user equipment (UE) and one or more second UEs aperiodically using control information to trigger the CSI reporting process. The aperiodic CSI process may include the base station transmitting a timing requirement and control information to a UE. The control information contains a CSI request may be received and decoded at the UE. According to the CSI request, the first UE may transmit a reference signal on the sidelink for the second UE(s) to measure. The UE(s) may generate and transmit a CSI report on the sidelink to first UE, and the first UE may aggregate the received CSI report(s) and transmit them to the base station within the
(Continued)

time period specified by the timing requirement received in the control information.

29 Claims, 21 Drawing Sheets

(51) Int. Cl.
    *H04B 17/309*     (2015.01)
    *H04L 5/00*     (2006.01)
    *H04W 8/24*     (2009.01)
    *H04W 24/10*     (2009.01)
    *H04W 56/00*     (2009.01)
    *H04W 72/23*     (2023.01)
    *H04W 92/18*     (2009.01)

(52) U.S. Cl.
    CPC .............. *H04W 8/24* (2013.01); *H04W 24/10* (2013.01); *H04W 72/23* (2023.01); *H04W 92/18* (2013.01)

(56) References Cited

U.S. PATENT DOCUMENTS

| | | | |
|---|---|---|---|
| 10,986,622 B2* | 4/2021 | Zhang | H04L 5/0094 |
| 11,071,164 B2* | 7/2021 | Zhou | H04W 16/04 |
| 11,153,060 B2* | 10/2021 | Babaei | H04W 76/28 |
| 11,368,950 B2* | 6/2022 | Liou | H04W 74/0808 |
| 11,405,143 B2* | 8/2022 | Park | H04L 1/1896 |
| 11,405,911 B2* | 8/2022 | Zhang | H04L 5/005 |
| 2010/0254329 A1* | 10/2010 | Pan | H04W 72/23 370/329 |
| 2016/0095080 A1* | 3/2016 | Khoryaev | G01S 5/0284 455/456.1 |
| 2017/0005706 A1* | 1/2017 | Khoshnevisan | H04L 1/0026 |
| 2017/0041059 A1 | 2/2017 | Yi et al. | |
| 2017/0311344 A1* | 10/2017 | Lee | H04W 74/0833 |
| 2018/0167116 A1* | 6/2018 | Rahman | H04B 7/0478 |
| 2018/0205577 A1* | 7/2018 | Shin | H04L 5/0048 |
| 2018/0206113 A1 | 7/2018 | He et al. | |
| 2018/0302889 A1* | 10/2018 | Guo | H04W 72/046 |
| 2018/0309530 A1* | 10/2018 | Nguyen | H04L 1/1812 |
| 2018/0368142 A1* | 12/2018 | Liou | H04W 74/0808 |
| 2019/0053089 A1* | 2/2019 | Kwak | H04W 72/23 |
| 2019/0090299 A1* | 3/2019 | Ang | H04W 52/0229 |
| 2019/0097874 A1 | 3/2019 | Zhou et al. | |
| 2019/0110325 A1* | 4/2019 | Gulati | H04L 5/0053 |
| 2019/0116605 A1* | 4/2019 | Luo | H04W 72/0446 |
| 2019/0124539 A1* | 4/2019 | Kim | H04W 24/10 |
| 2019/0173645 A1* | 6/2019 | Guo | H04L 5/0007 |
| 2019/0207662 A1* | 7/2019 | Zhou | H04W 24/08 |
| 2019/0273637 A1* | 9/2019 | Zhang | H04W 80/02 |
| 2019/0319758 A1* | 10/2019 | Yum | H04L 5/0051 |
| 2019/0364546 A1* | 11/2019 | Kwak | H04L 5/0044 |
| 2020/0029315 A1* | 1/2020 | Lin | H04L 1/0075 |
| 2020/0099476 A1* | 3/2020 | Park | H04W 4/70 |
| 2020/0177254 A1* | 6/2020 | Lee | H04W 76/27 |
| 2020/0260231 A1* | 8/2020 | Ganesan | H04L 5/0055 |
| 2020/0304969 A1* | 9/2020 | Basu Mallick | H04L 5/0055 |
| 2020/0374263 A1* | 11/2020 | Majmundar | H04W 8/082 |
| 2021/0410084 A1* | 12/2021 | Li | H04W 52/265 |
| 2022/0007309 A1* | 1/2022 | Dortschy | H04W 52/146 |
| 2022/0014325 A1* | 1/2022 | Zhao | H04L 5/0062 |
| 2022/0232549 A1* | 7/2022 | Yeo | H04L 5/0044 |

OTHER PUBLICATIONS

Ericsoon: "On SCI Formats", 3GPP Draft, R1-1813649, 3GPP TSG-RAN WG1 Meeting #94bis, Ericsson—On Sci Formats, 3rd Generation Partnership Project (3GPP), Mobile Competence Centre, 650, Route Des Lucioles, F-06921 Sophia-Antipolis Cedex, France, vol. RAN WG1, No. Chengdu, China; Oct. 8, 2018-Oct. 12, 2018, Nov. 11, 2018 (Nov. 11, 2018), XP051555707, 2 pages, Retrieved from the Internet: URL: http://www.3gpp.org/ftp/Meetings%5F3GPP%5FSYNC/RAN1/Docs/R1%2D1813649%2Ezip. [retrieved on Nov. 11, 2018] the whole document.

Ericsson: "On the Support of Sidelink CSI Feedbacks", 3GPP Draft, 3GPP TSG-RAN WG2 #105, R2-1901659—On On the Support of Sidelink CSI Feedbacks, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 14, 2019 (Feb. 14, 2019), XP051603012, 3 pages, Retrieved from the Internet: URL: http://www.3gpp.org/ftp/tsg%5Fran/WG2%5FRL2/TSGR2%5F105/Docs/R2%2D1901659%2Ezip. [retrieved on Feb. 14, 2019] the whole document.

Huawei, et al., "Sidelink CSI", 3GPP Draft, 3GPP TSG RAN WG1 Meeting #97, R1-1906595, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May, 17 2019, May 13, 2019 (May 13, 2019), XP051728046, 4 pages, Retrieved from the Internet: URL: http://www.3gpp.org/ftp/Meetings%5F3GPP%5FSYNC/RAN1/Docs/R1%2D1906595%2Ezip. [retrieved on May 13, 2019] the whole document.

Interdigital, et al., "On Physical Layer Procedures for NR V2X Sidelink", 3GPP Draft, 3GPP TSG RAN WG1 #97, R1-1907096, On Physical Layer Procedures for NR V2X Sidelink Final, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051728542, 9 pages, Retrieved from the Internet: URL: http://www.3gpp.org/ftp/Meetings%5F3GPP%5FSYNC/RAN1/Docs/R1%2D1907096%2Ezip. [retrieved on May 13, 2019] the whole document.

International Search Report and Written Opinion—PCT/US2020/039704—ISA/EPO—dated Oct. 14, 2020.

KYOCERA: "Physical Layer Procedures for CSI Acquisition in Unicast Transmissions", 3GPP Draft, 3GPP TSG-RAN WG1#97, R1-1907103, 3rd Generation Partnership Project (3GPP), Mobile Competence Centre, 650, Route Des Lucioles, F-06921 Sophia-Antipolis Cedex, France, vol. RAN WG1, No. Reno, Nevada, May 13, 2019-May 17, 2019, May 2, 2019 (May 2, 2019), XP051709132, 3 pages, Retrieved from the Internet: URL: http://www.3gpp.org/ftp/tsg%5Fran/WG1%5FRL1/TSGR1%5F97/Docs/R1%2D1907103%2Ezip. [retrieved on May 2, 2019] p. 2-p. 3 figures 1-2.

* cited by examiner

TIMELINE CONSIDERATIONS FOR CHANNEL STATE INFORMATION REPORTING OF A SIDELINK CHANNEL

CROSS REFERENCE

The present Application for Patent claims the benefit of Greek Provisional Patent Application No. 20190100336 by MANOLAKOS et al., entitled "TIMELINE CONSIDERATIONS FOR CHANNEL STATE INFORMATION REPORTING OF A SIDELINK CHANNEL," filed Aug. 6, 2019, assigned to the assignee hereof, and expressly incorporated by reference herein.

BACKGROUND

The following relates generally to wireless communications, and more specifically to timeline considerations for channel state information reporting of a sidelink channel.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may support both access links and sidelinks. An access link is a communication link between a UE and a base station. In some examples, an access link may be referred to as a Uu interface. Specifically, the Uu interface may refer to an over-the-air interface for downlink transmissions, uplink transmissions, or a both. A sidelink is a communication link between similar devices. For example, a sidelink may support communications between multiple UEs or may support communications between multiple base stations. In some examples, an access link may be referred to as a PC5 interface (e.g., supporting vehicle-to-everything (V2X) and/or vehicle-to-vehicle (V2V) communications between vehicles in a system). In some cases, a sidelink may be referred to as a device-to-device (D2D) link and may support unicast messaging, broadcast messaging, or both. In some cases, a base station may instruct a UE to transmit a reference signal on a sidelink that one or more UEs may measure and respond to with channel state information (CSI) reports for a sidelink channel. The transmitting UE that is connected to the base station may then decode transmit the CSI reports to the base station. The wireless communications system may be unable to coordinate this reporting timeline unless timing details are configured.

SUMMARY

The described techniques relate to improved methods, systems, devices, and apparatuses that support timeline considerations for channel state information (CSI) reporting of a sidelink channel. Generally, the described techniques provide for improved coordination of the CSI reporting timeline based on the process initialization by downlink control information (DCI). As described herein, sidelink communications may refer to any communications between a first user equipment (UE) and a second UE in a wireless communications system, such as device-to-device (D2D) communications, vehicle-to-everything (V2X) and/or vehicle-to-vehicle (V2V) communications, message relaying, discovery signaling, beacon signaling, or any combination of these or other signals transmitted over-the-air from one UE to one or more other UEs.

In some cases, a base station may coordinate the sidelink communications between UEs. For example, the base station may schedule CSI reporting of the sidelink via downlink communications to all of the UEs involved in the sidelink communications. In another example, the base station may schedule CSI reporting of the sidelink via downlink communications to a portion of the UEs (e.g., UE1) involved in the sidelink communications based on one or more UEs (e.g., UE2) being out of coverage of the base station. There may be a UE connected to the base station (e.g., capable of downlink and uplink communications) that transmits a reference signal on the sidelink that one or more UEs may measure and respond to with CSI reports for the sidelink channel.

In order to coordinate this CSI timeline when sidelink channels are measured, a base station may define a new time requirement, Z". This new time requirement may correspond to the time needed for the connected UE (e.g., UE1) to aggregate and transmit the sidelink CSI reports. Z" may being after the connected UE has received a CSI report from a sidelink UE. In some cases, this time requirement, Z", may be based on the capabilities of the connected UE. In some cases, a CSI reception time window may be configured for the connected UE that defines how long the connected UE should attempt to receive CSI reports from the sidelink channel before dropping or using a false CSI report for those CSI reports not received. This may avoid delays caused by waiting for CSI reports from sidelink UEs that may not be received within the time window.

DETAILED DESCRIPTION

Figure 1:
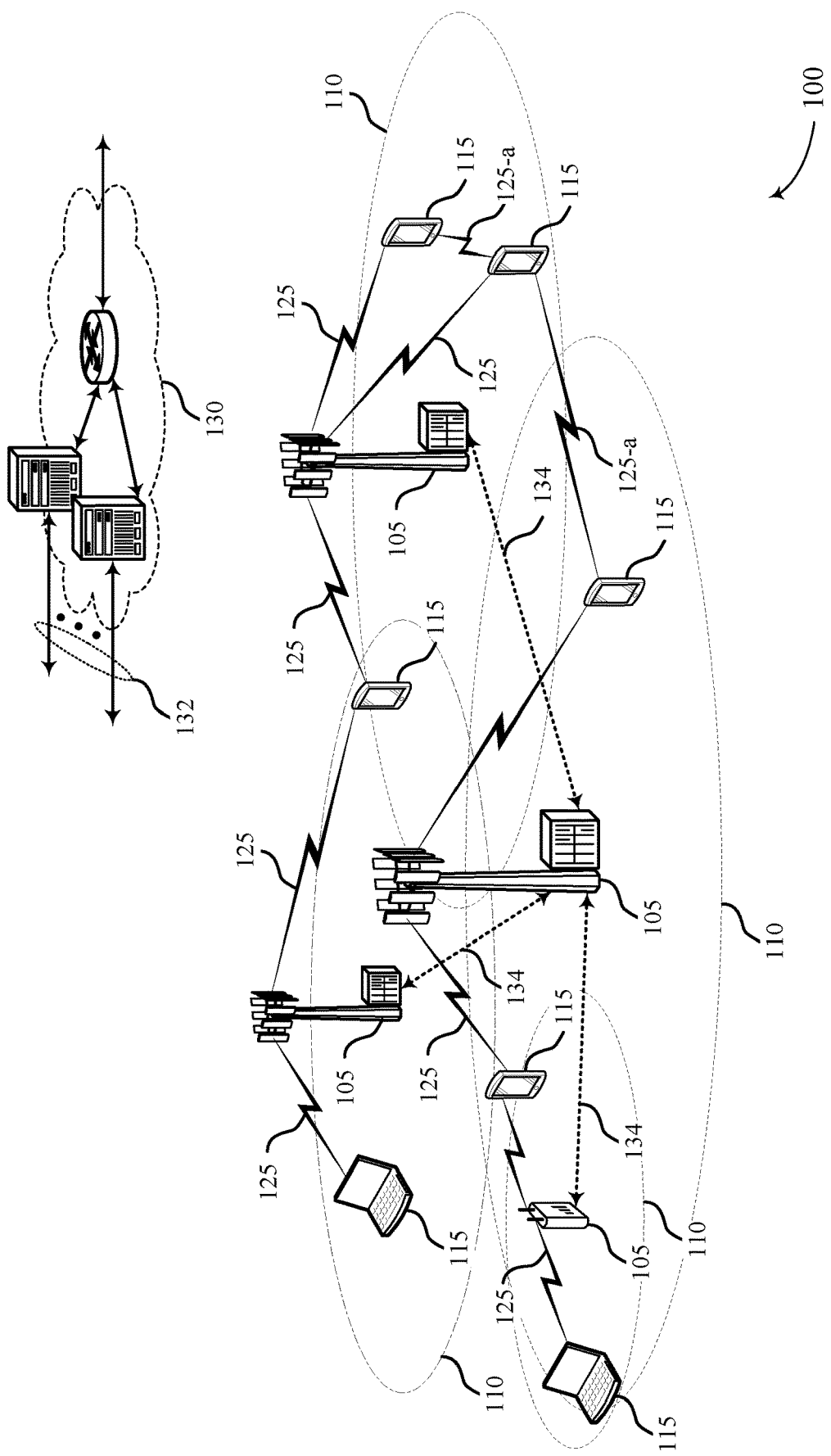
FIGS. 1 and 2 illustrate examples of a system for wireless communications that supports timeline considerations for channel state information reporting of a sidelink channel in accordance with aspects of the present disclosure.

A wireless communications system may support both access links and sidelinks for communications between wireless devices. An access link may refer to any communication link between a user equipment (UE) and a base station. For example, an access link may support uplink signaling, downlink signaling, connection procedures, etc. A sidelink may refer to any communication link between UEs. For example, a sidelink may support device-to-device (D2D) communications, vehicle-to-everything (V2X) and/or vehicle-to-vehicle (V2V) communications, message relaying, discovery signaling, beacon signaling, or any combination of these or other signals transmitted over-the-air from one UE to one or more other UEs.

Example sidelink channels used for side link communications may include the physical sidelink discovery channel (PSDCH), the physical sidelink control channel (PSCCH), the physical sidelink shared channel (PSSCH), and the physical sidelink feedback channel (PSFCH). The PSDCH may carry discovery expressions such that proximal devices are able to discover each other's presence. The PSCCH may carry resource and other parameters used for data (e.g., the PSSCH). In some cases, the starting symbol and the number of symbols for a PSCCH are assumed to be known to the receiving UE before decoding the PSCCH. The PSSCH may carry data, and for the operation regarding PSSCH, a UE may perform either transmission or reception in a slot on a carrier. For new radio (NR) systems, two or more PSSCH options for the UE may exist. In one example, all of the symbols in a slot may be available for sidelink (e.g., PSSCH). In another example, a subset of consecutive symbols in a slot may be available for sidelink (e.g., PSSCH). The PSFCH may carry feedback information, and in NR systems a sequence-based PSFCH format with one symbol (not including automatic gain control (AGC) training period) may be supported.

In some wireless communications systems, a base station may update its channel state information (CSI) on a sidelink between a first UE (e.g., UE1) and one or more second UEs (e.g., UE2) aperiodically using control information (e.g., downlink control information (DCI) or sidelink control information) to trigger the CSI reporting process. The aperiodic CSI process may include the base station transmitting control information containing a timing requirement to UE1 and optionally to UE2. The control information, which contains a CSI request may be received and decoded at UE1. UE2 may receive, from the base station or UE1, the control information and decode the CSI request. According to the CSI request, UE1 may transmit an aperiodic reference signal (AP-RS) on the sidelink for UE2 to measure. After UE2 measures the AP-RS, UE2 may generate and transmit a CSI report on the sidelink to UE1. Then, UE1 may receive one or more CSI reports, decodes the one or more CSI reports, and reports them to the base station. UE1 may aggregate the decoded one or more CSI reports and transmit them to the base station within the time period specified by the timing requirement received in the control information. The timing requirement may be based on the capability of UE1.

Additionally, the base station may configure (e.g., semi-statically configure) UE1 with a reception time window. Specifically, all CSI reports may be expected to be received within the specified or configured reception time window (e.g., X slots). CSI reports not received within the specified or configured reception time window may not be aggregated with the CSI reports received within the specified or configured reception time window, and instead the late CSI reports may be dropped or a false CSI report may be used in place of the expected report. A false report may include dummy information (e.g., zeros) or a previous CSI report (e.g., a stale report).

Aspects of the disclosure are initially described in the context of a wireless communications system. Additional aspects are described with reference to process flows. Aspects of the disclosure are further illustrated by and described with reference to apparatus diagrams, system diagrams, and flowcharts that relate to timeline considerations for channel state information reporting of a sidelink channel.

FIG. 1 illustrates an example of a wireless communications system 100 that supports timeline considerations for channel state information reporting of a sidelink channel in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may support both access links (e.g., communication links 125) and sidelinks (e.g., communication links 125-a) for communications between wireless devices. An access link may refer to any communication link 125 between a UE 115 and a base station 105, which also may be referred to as Uu. For example, an access link may support uplink signaling, downlink signaling, connection procedures, etc. A sidelink may refer to any communication link 125-s between UEs 115. For example, a sidelink may support device-to-device (D2D) communications, vehicle-to-everything (V2X) and/or vehicle-to-vehicle (V2V) communications, message relaying, discovery signaling, beacon signaling, or any combination of these or other signals transmitted over-the-air from one UE 115 to one or more other UEs 115.

In some cases, a NR system may use sidelinks 125-a for NR-V2X communications with a specific sidelink physical layer structure. For example, the configuration for a sidelink bandwidth part (BWP) may be separate from Uu BWP configuration signaling. The same sidelink BWP may be used for both transmission and reception. Also, a UE 115 may not be expected to use different numerology in the configured sidelink BWP and active uplink BWP in the same carrier at a given time. For time domain resources of a resource pool for PSSCH, the resource pool may consist of non-contiguous time resources. For frequency domain resources of a resource pool for PSSCH, the resource pool may consist of one or both of contiguous PRBs or non-contiguous PRBs.

The NR-V2X sidelink physical layer structure may allow CSI reporting to be enabled and disabled by configuration. In some cases, a subset of the metrics for CSI reporting may be configured. At least sidelink CSI-RS for CQI/RI measurement for no more than two ports may be supported, and sidelink CSI-RS may be confined within the PSSCH transmission. In mode 1 for unicast and groupcast, it may be supported for the transmitter UE 115 via Uu access link to report an indication to base station 105 to indicate the need for retransmission of a transport block transmitted by the transmitter UE 115.

A NR system may follow a CSI timeline such that when aperiodic CSI reports are triggered by a downlink channel (e.g., the physical downlink control channel (PDCCH)), the UE 115 may have available computational resources to calculate the report and enough time to perform the computation. Some timing requirements for aperiodic CSI reporting may be defined for NR systems. A first requirement may be defined as the minimum number of OFDM symbols, Z, between the last symbol of the PDCCH triggering the aperiodic CSI report and the first symbol of the PUSCH that carries the CSI report. During this time, the UE 115 should be able to decode the PDCCH, perform possible CSI-RS/IM measurements (if UE 115 does not already have an up-to-date previous channel/interference measurement stored in its memory), perform possible channel estimation, calculate the CSI report, and perform uplink control information (UCI) multiplexing with UL-SCH. However, if aperiodic CSI-RS/IM is used with the report, this first requirement alone may not guarantee that the UE 115 has sufficient time to compute the CSI, since the aperiodic CSI-RS could potentially be triggered close to the PUSCH transmission. Therefore, the second requirement may be defined as the minimum number of OFDM symbols Z' between the last symbol of the aperiodic CSI-RS/IM used to calculate the report and the first symbol of the PUSCH which carries the CSI report. The Z and Z' timing requirements may be different in that the Z requirement may encompass DCI decoding time (e.g., a few symbols) while Z' may not.

If the Z or Z' is not fulfilled and the base station 105 triggers the PUSCH too close to the PDCCH (or the aperiodic CSI-RS/IM), the UE 115 may ignore the scheduling DCI if the UE 115 is not also scheduled with UL-SCH or HARQ-ACK, and UE 115 may not transmit anything. If UL-SCH or HARQ-ACK needs to be multiplexed on the PUSCH however, the UE 115 may still transmit the PUSCH but pads the CSI report with dummy bits or transmits a stale CSI report.

With respect to aperiodic reference signal (RS) timelines in NR, UE 115 may transmit a configured resource once it receives a PDCCH with DCI that explicitly triggers the RS resource. The UE 115 may transmit the resource in a later slot than the one containing the PDCCH depending on a configured slot offset. The slot offset for aperiodic RS may be a semi-statically configured value between 1 and 32 slots, where 1 refers to the next slot after the one in which the DCI trigger is received. In some cases, the slot offset may be configured at a resource set level. Further, a minimum interval between DCI and RS may be a function of N2 (minimum time between DCI and PUSCH), which may be based on UE 115 capability.

In some wireless communications systems, a base station 105 may update its CSI on a sidelink between a first UE 115 (e.g., UE1) and one or more second UEs 115 (e.g., UE2) aperiodically using DCI to trigger the CSI reporting process. The aperiodic CSI process may include the base station 105 transmitting DCI containing a timing requirement to UE1 and optionally to UE2. The DCI, which contains a CSI request may be received and decoded at UE1. UE2 may receive, from the base station 105 or UE1, the DCI and decode the CSI request. According to the CSI request, UE1 may transmit an aperiodic reference signal (AP-RS) on the sidelink for UE2 to measure. After UE2 measures the AP-RS, UE2 may generate and transmit a CSI report on the sidelink to UE1. Then, UE1 may receive one or more CSI reports, decodes the one or more CSI reports, and reports them to the base station 105. UE1 may aggregate the decoded one or more CSI reports and transmit them to the base station 105 within the time period specified by the timing requirement received in the DCI. The timing requirement may be based on the capability of UE1.

Figure 2:
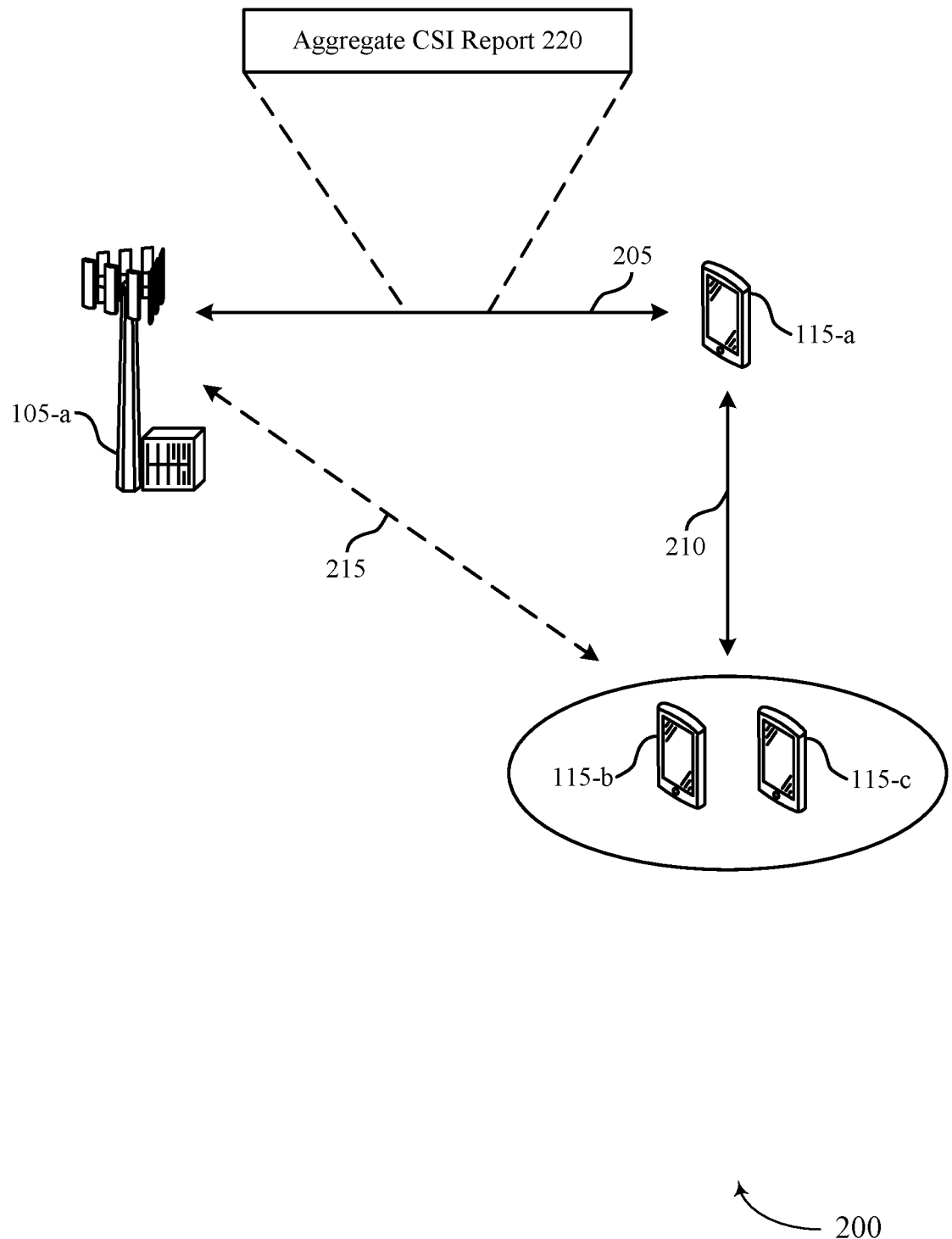

FIG. 2 illustrates an example of a wireless communications system 200 that supports timeline considerations for channel state information reporting of a sidelink channel in accordance with aspects of the present disclosure. In some examples, wireless communications system 200 may implement aspects of wireless communications system 100. In some examples, the wireless communications system 200 may include a connected UE 115-a and sidelink UEs 115-b and 115-c, which may be examples of a UE 115 described with reference to FIG. 1. The wireless communications system 200 may also include base station 105-a, which may be an example of a base station 105 described with reference to FIG. 1.

Base station 105-a and connected UE 115-a may communicate over access link, Uu, 205. Base station 105-a and sidelink UEs 115-b and 115-c may communicate over access link, Uu, 215. For example, when sidelink UEs 115-b and 115-c are in a partial coverage mode with base station 105-a, base station 105-a may transmit downlink information to UEs 115-b and 115-c, however, UEs 115-b and 115-c may not be able to transmit uplink information to base station 105-a. Connected UE 115-a may communicate with sidelink UEs 115-b and 115-c over sidelink 210. In some examples, base station 105-a may coordinate sidelink communications between UEs 115-a, 115-b, and 115-c. In some cases, one or more of sidelink UEs 115-b and 115-c may be out of coverage of base station 105-a.

Wireless communications system 200 may perform aperiodic sidelink RS transmission and CSI reporting triggered by DCI from base station 105-a. For example, base station 105-a may transmit, via access link 205, DCI containing a timing requirement based on a minimum time needed for connected UE 115-a to aggregate received CSI reports and re-transmit them to base station 105-a. The DCI, which may contain a CSI request may be received and decoded at connected UE 115-a. Sidelink UEs 115-b and 115-c may receive, from the base station 105-a or connected UE 115-a, the DCI and decode the CSI request. For instance, if sidelink UE 115-b is in a partial coverage mode with respect to base station 105-a, then sidelink UE 115-b may receive the DCI from the base station 105-a; whereas, if sidelink UE 115-c is out of coverage with respect to base station 105-a, then sidelink UE 115-c may receive the DCI from connected UE 115-a.

In some cases, a common DCI may be transmitted from base station 105-a to UEs 115-a, 115-b, and 115-c. Alternatively, separate DCIs (e.g., UE-specific DCIs) may be transmitted from base station 105-*a* to each of UEs 115-*a*, 115-*b*, and 115-*c*. When separate DCIs trigger connected UE 115-*a*'s AP-RS transmission and sidelink UEs 115-*b* and 115-*c*'s AP-RS measurement and CSI report, the DCI triggering the CSI report of sidelink UEs 115-*b* and 115-*c* should be in the same slot as (or earlier than) the slot containing the AP-RS of connected UE 115-*a*. When the same DCI is sent to connected UE 115-*a* and sidelink UEs 115-*b* and 115-*c*, the DCI may trigger the AP-RS of connected UE 115-*a*, CSI report for UE1 associated with PUSCH (or PSSCH) configuration, and the CSI report of sidelink UEs 115-*b* and 115-*c* with a PSSCH configuration.

According to the CSI request, connected UE 115-*a* may transmit an aperiodic reference signal (AP-RS) on sidelink 210 for sidelink UEs 115-*b* and 115-*c* to measure. After sidelink UEs 115-*b* and 115-*c* measures the AP-RS, they may generate and transmit CSI reports on sidelink 210 to connected UE 115-*a*. Then, connected UE 115-*a* may receive the one or more CSI reports, decode the one or more CSI reports, and report the aggregated CSI reports 220 to the base station 105 on access link 205. Connected UE 115-*a* may aggregate the decoded one or more CSI reports and transmit them to the base station 105 within the time period specified by the timing requirement received in the DCI. In some cases, DCI received from base station 105-*a* may indicate to connected UE 115-*a* how to aggregate the CSI reports. A timing requirement, Z', may be defined with respect to the transmission of the RS of connected UE 115-*a* whereas a different timing requirement, Z, is defined with respect to the reception of the DCI received for sidelink UEs 115-*b* and 115-*c*. The timing requirement may be based on the capability of connected UE 115-*a*.

More specifically, Z may be defined as the minimum number of OFDM symbols between the last symbol of the PDCCH carrying the DCI that triggers the aperiodic CSI report and the first symbol of the PUSCH which carries the CSI report, and in this time the connected UE 115-*a* should be able to decode the DCI, perform possible CSI-RS/IM measurements, perform possible channel estimation, calculate the CSI report, and perform UCI multiplexing with UL-SCH. Z' may similar to Z but does not encompass the DCI decoding time. In conventional timelines, sidelink is not considered, and thus, no timing requirement is defined for connected UE 115-*a* to decode and aggregate the CSI reports received from sidelink UEs 115-*b* and 115-*c* and then transmit the aggregated report to base station 105-*a*.

In order to manage the existing aperiodic CSI timeline when sidelink channels are measured, base station 105-*a* may determine a new minimum time requirement, Z". This new time period corresponds to the time needed for connected UE 115-*a* to aggregate and transmit the sidelink CSI reports. Z" may being after connected UE 115-*a* has received a CSI report from a sidelink UE 115-*b* or 115-*c*. This minimum time requirement, Z", may be based on the capabilities (e.g., processing capabilities) of connected UE 115-*a*. If the timing requirement(s) indicated in the DCI are shorter than the minimum time UEs 115-*a*, 115-*b*, and 115-*c* can perform the CSI process, then connected UE 115-*a* may drop the aggregated CSI report, may use a previous stale aggregated CSI report, or may insert a dummy aggregated CSI report. This may avoid unnecessary power consumption by UEs 115-*a*, 115-*b*, and 115-*c* caused by attempting a CSI reporting process with no chance of the aggregate CSI report being ready within the specified time requirement.

In some cases, another time window may be configured for connected UE 115-*a* that defines how long connected UE 115-*a* should attempt to receive CSI reports from sidelink UEs 115-*b* and 115-*c* before dropping those CSI reports not received. For example, all CSI reports are expected to be received within a specified or configured time window, which may be define in relation to the transmission of the AP-RS or the first reception of a CSI report. For instance, if connected UE 115-*a* transmits an AP-RS to sidelink UEs 115-*b* and 115-*c*, and sidelink UE 115-*b* reports back a CSI report within the time window (e.g., X slots) but sidelink UE 115-*c* does not, then an updated CSI report for sidelink UE 115-*b* may be transmitted to base station 105-*a* by connect UE 115-*b*, but an updated CSI report for sidelink UE 115-*c* will not be transmitted to base station 105-*a*. Instead, connected UE 115-*a* may drop the CSI report corresponding to sidelink UE 115-*c*, may use a previous stale CSI report, or may insert a dummy report. This may avoid delays caused by waiting for CSI reports from sidelink UEs 115-*b* and 115-*c* that are not received within the time window. In this example, the minimum timing requirement, Z", may be defined as the minimum time for the transmission of the aggregated CSI report (e.g., on the physical uplink shared channel (PUSCH) or the physical uplink control channel (PUCCH)) with respect to the reception of latest sidelink UE 115-*b* or 115-*c*'s report within the reception time window.

For the case when one or more sidelink UEs 115-*b* and 115-*c* are out of coverage from base station 105-*a*, one or multiple DCI (e.g., DCI in the PSCCH) from connected UE 115-*a* on sidelink 210 towards sidelink UEs 115-*b* and 115-*c* may be used to trigger the AP-RS measurement and CSI reporting. In some examples, each DCI triggering the CSI reports in the corresponding resource pool. For time domain resources of a resource pool for PSSCH, the resource pool may consist of non-contiguous time resources. For frequency domain resources of a resource pool for PSSCH, the resource pool may consist of one or both of contiguous PRBs or non-contiguous PRBs. If multiple resource pools are present, then connected UE 115-*a* may transmit an AP-RS for each resource pool.

Figure 3:
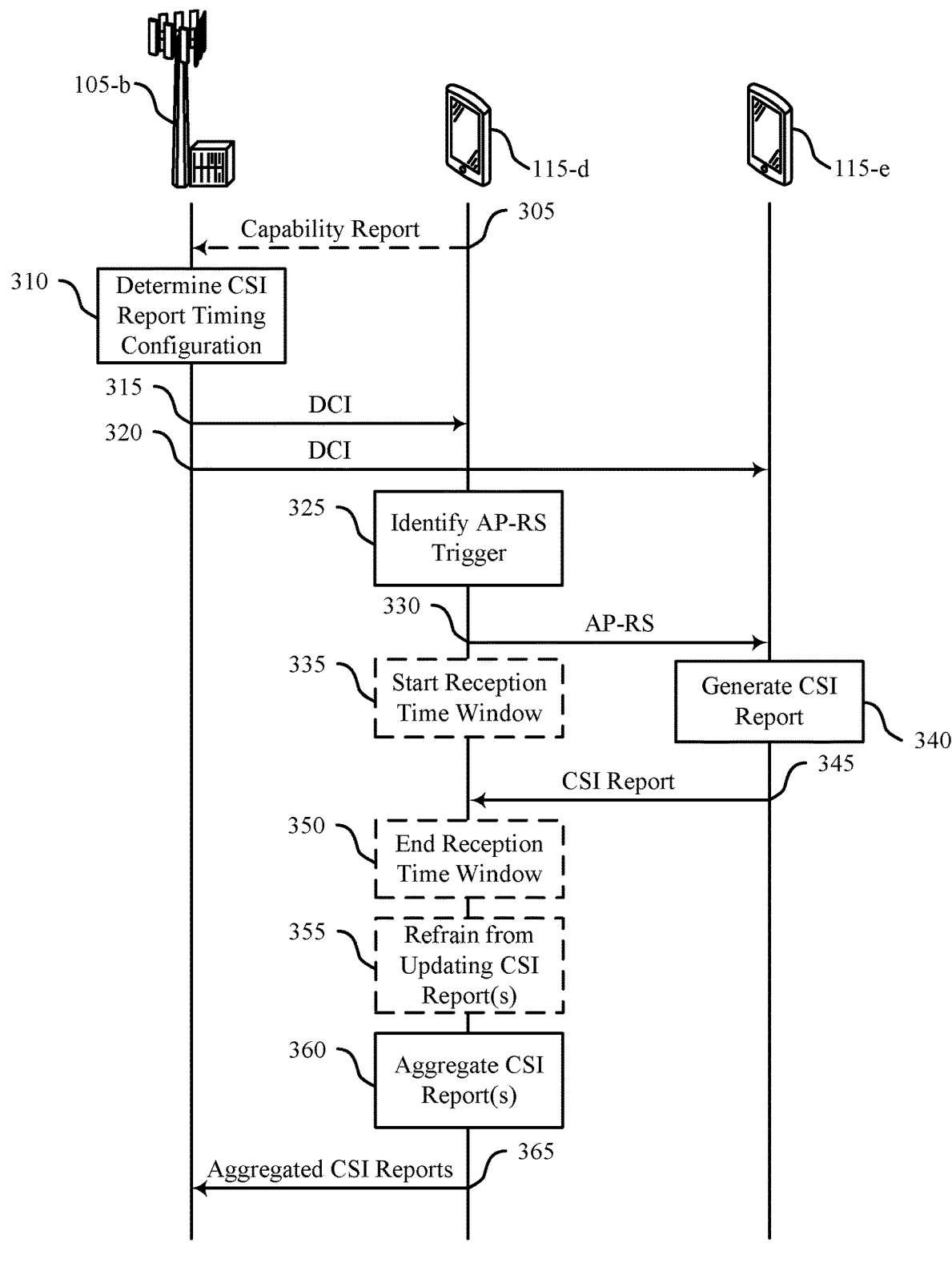
FIGS. 3 and 4 illustrate examples of process flows that supports timeline considerations for channel state information reporting of a sidelink channel in accordance with aspects of the present disclosure.

FIG. 3 illustrates an example of a process flow 300 that supports timeline considerations for channel state information reporting of a sidelink channel in accordance with aspects of the present disclosure. In some examples, process flow 300 may implement aspects of wireless communications system 100. Process flow 300 may be implemented by a base station 105-*b* and UEs 115-*d* and 115-*e*, which may be examples of a base station 105 and UE 115, respectively, as described with reference to FIG. 1. Alternative examples of the following may be implemented, where some steps are performed in a different order than described or are not performed at all. In some cases, steps may include additional features not mentioned below, or further steps may be added.

At 305, UE 115-*d* may optionally transmit and base station 105-*b* may optionally receive a capability report including UE timing capabilities.

At 310, base station 105-*b* may determine a CSI report timing configuration based at least in part on a capability of UE 115-*d*.

At 315, base station 105-*b* may transmit and UE 115-*d* may receive a first DCI including the CSI timing configuration and a trigger of an AP-RS, which may be based at least in part on the capability report optionally transmitted at 305.

At 320, base station 105-*b* may transmit and UE 115-*e* may receive downlink control information comprising a CSI report timing configuration and a trigger to measure an aperiodic reference signal. In some cases, DCI transmitted at 315 and 320 are the same (e.g., common DCI) or DCI transmitted at 315 and 320 are different (e.g., UE-specific DCI).

At 325, UE 115-d may identify an AP-RS trigger in the received DCI.

At 330, UE 115-d may transmit and UE 115-e may receive the AP-RS on a sidelink channel based at least in part on the trigger received in the first and/or second DCI. In some cases, the DCI and the AP-RS are in a same slot, or the DCI is in a first slot that occurs prior to a subsequent slot including the AP-RS.

At 335, UE 115-d may optionally start a reception time window, which may be configured by the base station 105-b semi-statically.

At 340, UE 115-e may generate a CSI report prior to the termination of the CSI report timing configuration.

At 345, UE 115-e may transmit and UE 115-d may receive the CSI report prior to the termination of the CSI report timing configuration.

At 350, UE 115-d may optionally end the reception time window.

At 355, UE 115-d may optionally refrain from updating one or more CSI report(s), which may include dropping one or more CSI reports received after the termination of the reception time window 350. Additionally or alternatively, refraining may include transmitting, to base station 105-b, false aggregated CSI reports on the uplink channel prior to the termination of the CSI report timing configuration for the one or more CSI reports received after the termination of the reception time window.

At 360, UE 115-d may aggregate the received CSI reports. For example, UE 115-d may aggregate the CSI reports received within the reception time window.

At 365, UE 115-d may transmit and base station 105-b may receive an aggregated CSI report of a sidelink channel between UE 115-d and at least UE 115-e, the aggregated CSI report received on an uplink channel prior to a termination of the CSI report timing configuration. In some cases, the aggregated CSI report may include one or more false CSI reports when the CSI report timing configuration is shorter than the reported UE timing capabilities. In some cases, the CSI report timing configuration defines a time period for the UE 115-d to transmit the aggregated CSI reports at 365 with respect to when UE 115-d receives the one or more CSI reports at 345. In another example, the CSI report timing configuration defines a time period for the UE 115-d to transmit the aggregated CSI reports at 365 with respect to when UE 115-d receives the DCI at 315.

Figure 4:
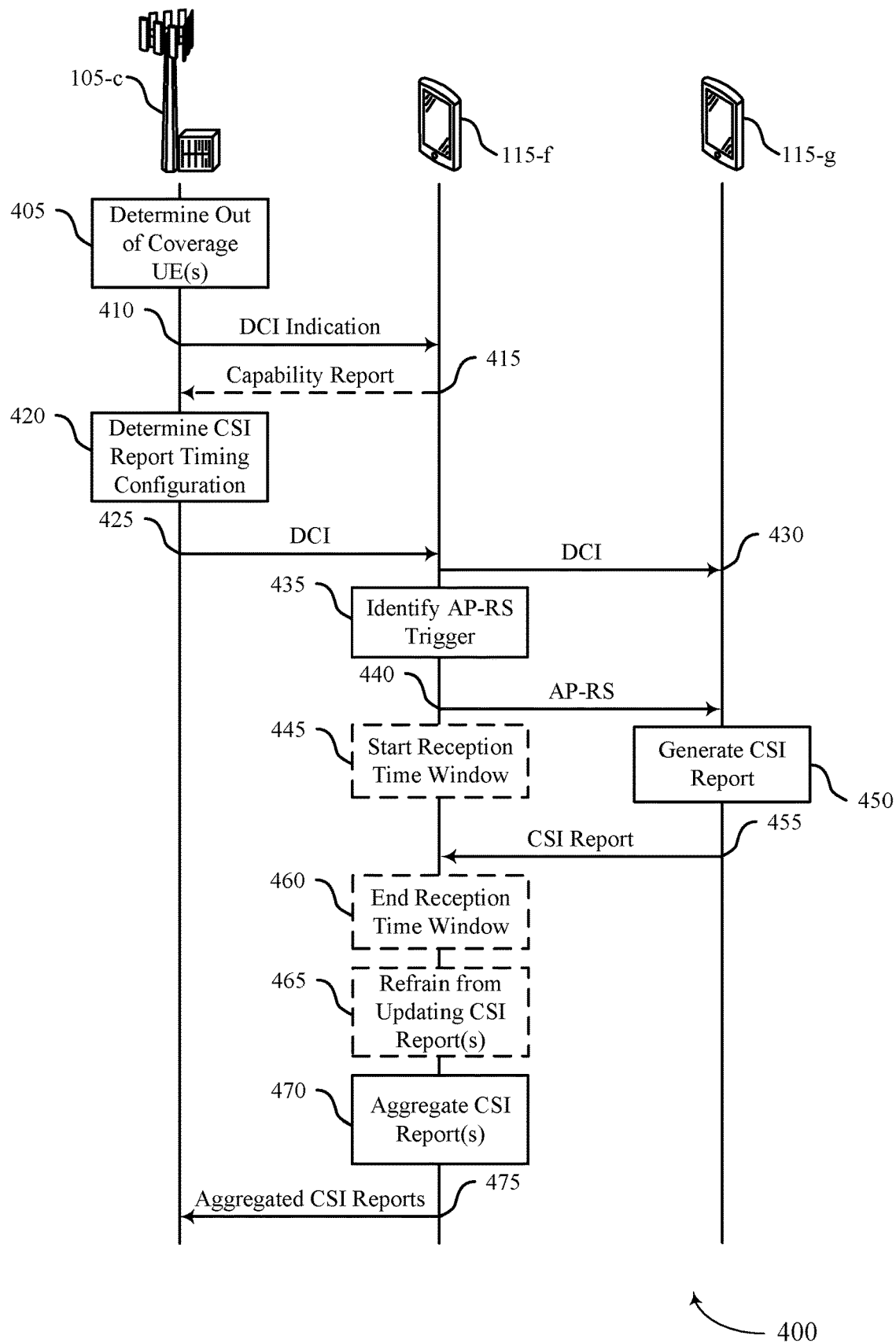

FIG. 4 illustrates an example of a process flow 400 that supports timeline considerations for channel state information reporting of a sidelink channel in accordance with aspects of the present disclosure. In some examples, process flow 400 may implement aspects of wireless communications system 100. Process flow 400 may be implemented by a base station 105-c and UEs 115-f and 115-g, which may be examples of a base station 105 and UE 115, respectively, as described with reference to FIG. 1. Alternative examples of the following may be implemented, where some steps are performed in a different order than described or are not performed at all. In some cases, steps may include additional features not mentioned below, or further steps may be added.

At 405, base station 105-c may determine that one or more UEs 115-g are out of coverage of the base station.

At 410, base station 105-c may transmit and UE 115-f may receive an indication to transmit DCI to UE 115-g based at least in part on UE 115-g being out of coverage from the base station as determined at 405.

At 415, UE 115-f may optionally transmit and base station 105-c may optionally receive a capability report including UE timing capabilities.

At 420, base station 105-c may determine a CSI report timing configuration based at least in part on a capability of UE 115-f and/or a capability of at least UE 115-g.

At 425, base station 105-c may transmit and UE 115-f may receive a first DCI including the CSI timing configuration and a trigger of an AP-RS, which may be based at least in part on the capability report optionally transmitted at 415.

At 430, UE 115-f may transmit and UE 115-g may receive a second DCI including the CSI report timing configuration and a trigger to measure the aperiodic reference signal.

At 435, UE 115-f may identify an AP-RS trigger in the received DCI.

At 440, UE 115-f may transmit and UE 115-g may receive the AP-RS on a sidelink channel based at least in part on the trigger received in the first DCI. In some cases, the first DCI and the AP-RS are in a same slot, or the first DCI is in a first slot that occurs prior to a second slot including the AP-RS.

At 445, UE 115-f may optionally start a reception time window, which may be configured by the base station 105-c semi-statically.

At 450, UE 115-g may generate a CSI report prior to the termination of the CSI report timing configuration.

At 455, UE 115-g may transmit and UE 115-f may receive the CSI report prior to the termination of the CSI report timing configuration.

At 460, UE 115-f may optionally end the reception time window.

At 465, UE 115-f may optionally refrain from updating one or more CSI report(s), which may include dropping one or more CSI reports received after the termination of the reception time window 460. Additionally or alternatively, refraining may include transmitting, to base station 105-c, false aggregated CSI reports on the uplink channel prior to the termination of the CSI report timing configuration for the one or more CSI reports received after the termination of the reception time window.

At 470, UE 115-f may aggregate the received CSI reports. For instance, UE 115-f may aggregate the CSI reports received within the reception time window.

At 475, UE 115-f may transmit and base station 105-c may receive an aggregated CSI report of a sidelink channel between UE 115-f and at least UE 115-g, the aggregated CSI report received on an uplink channel prior to a termination of the CSI report timing configuration. In some cases, the aggregated CSI report may include one or more false CSI reports when the CSI report timing configuration is shorter than the reported UE timing capabilities.

In some cases, the CSI report timing configuration defines a time period for the UE 115-f to transmit the aggregated CSI reports at 475 with respect to when UE 115-f receives the one or more CSI reports at 455. In another example, the CSI report timing configuration defines a time period for the UE 115-f to transmit the aggregated CSI reports at 475 with respect to when UE 115-f receives the DCI at 425.

Figure 5:
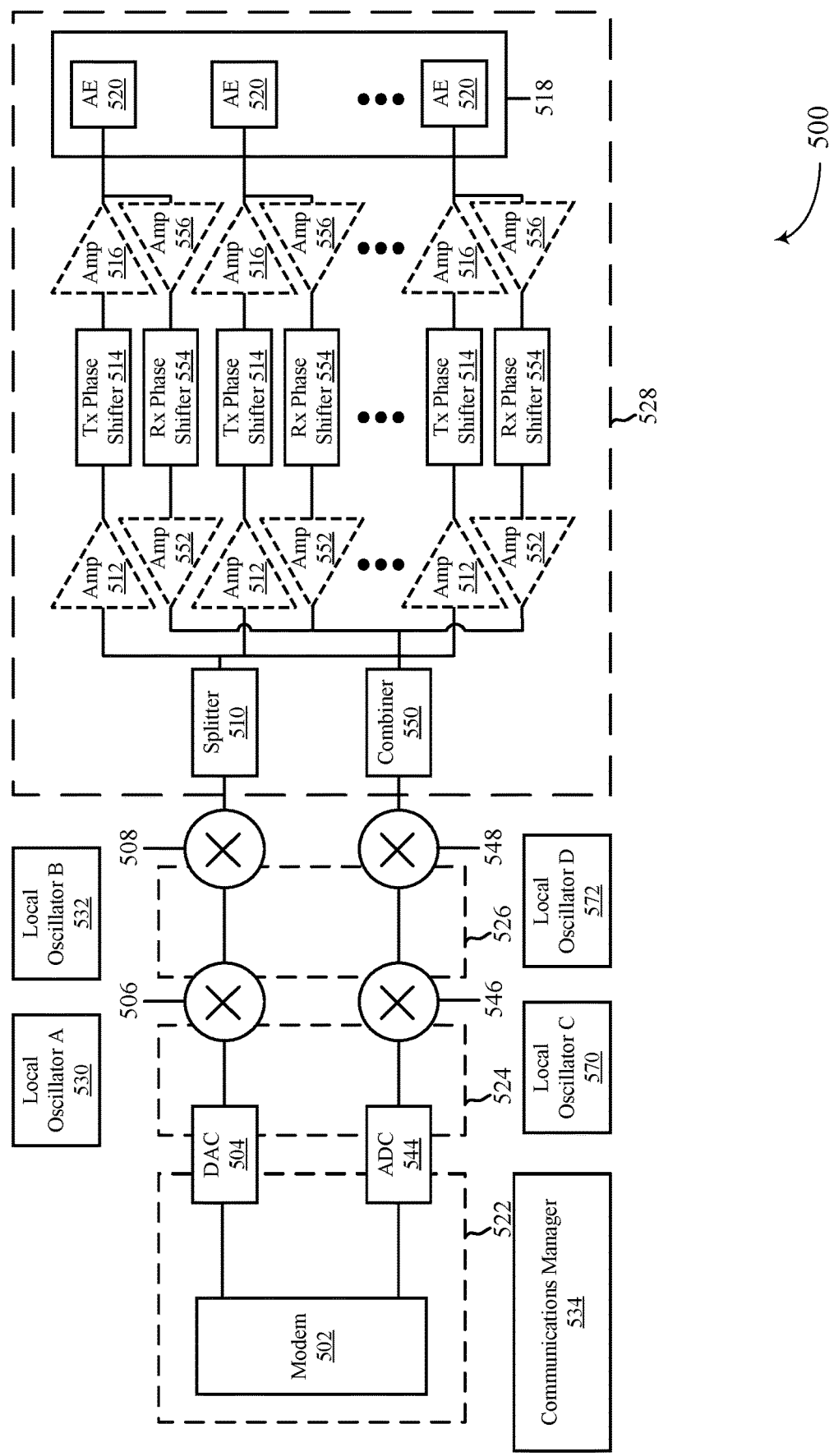
FIG. 5 illustrates an example of an architecture that supports timeline considerations for channel state information reporting of a sidelink channel in accordance with aspects of the present disclosure.

FIG. 5 illustrates an example of an architecture 500 that supports timeline considerations for channel state information reporting of a sidelink channel in accordance with aspects of the present disclosure. In some examples, architecture 500 may implement aspects of wireless communications systems 100 and/or 200. In some cases, architecture 500 may be an example of a transmitting device (e.g., a first wireless device, such as a UE 115 or base station 105) and/or a receiving device (e.g., a second wireless device, such as a UE 115 or base station 105) as described herein.

FIG. 5 illustrates example hardware components of a wireless device in accordance with one or more aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 500 includes a modem (modulator/demodulator) 502, a digital to analog converter (DAC) 504, a first mixer 506, a second mixer 508, and a splitter 510. The architecture 500 also includes a plurality of first amplifiers 512, a plurality of phase shifters 514, a plurality of second amplifiers 516, and an antenna array 518 that includes a plurality of antenna elements 520. Transmission lines or other waveguides, wires, traces, or the like are shown connecting the various components to illustrate how signals to be transmitted may travel between components. Boxes 522, 524, 526, and 528 indicate regions in the architecture 500 in which different types of signals travel or are processed. Specifically, box 522 indicates a region in which digital baseband signals travel or are processed, box 524 indicates a region in which analog baseband signals travel or are processed, box 526 indicates a region in which analog intermediate frequency (IF) signals travel or are processed, and box 528 indicates a region in which analog radio frequency (RF) signals travel or are processed. The architecture also includes a local oscillator A 530, a local oscillator B 532, and a communications manager 534.

Each of the antenna elements 520 may include one or more sub-elements (not shown) for radiating or receiving RF signals. For example, a single antenna element 520 may include a first sub-element cross-polarized with a second sub-element that can be used to independently transmit cross-polarized signals. The antenna elements 520 may include patch antennas or other types of antennas arranged in a linear, two dimensional, or other pattern. A spacing between antenna elements 520 may be such that signals with a desired wavelength transmitted separately by the antenna elements 520 may interact or interfere (e.g., to form a desired beam). For example, given an expected range of wavelengths or frequencies, the spacing may provide a quarter wavelength, half wavelength, or other fraction of a wavelength of spacing between neighboring antenna elements 520 to allow for interaction or interference of signals transmitted by the separate antenna elements 520 within that expected range.

The modem 502 processes and generates digital baseband signals and may also control operation of the DAC 504, first and second mixers 506, 508, splitter 510, first amplifiers 512, phase shifters 514, and/or the second amplifiers 516 to transmit signals via one or more or all of the antenna elements 520. The modem 502 may process signals and control operation in accordance with a communication standard such as a wireless standard discussed herein. The DAC 504 may convert digital baseband signals received from the modem 502 (and that are to be transmitted) into analog baseband signals. The first mixer 506 upconverts analog baseband signals to analog IF signals within an IF using a local oscillator A 530. For example, the first mixer 506 may mix the signals with an oscillating signal generated by the local oscillator A 530 to "move" the baseband analog signals to the IF. In some cases some processing or filtering (not shown) may take place at the IF. The second mixer 508 upconverts the analog IF signals to analog RF signals using the local oscillator B 532. Similarly to the first mixer, the second mixer 508 may mix the signals with an oscillating signal generated by the local oscillator B 532 to "move" the IF analog signals to the RF, or the frequency at which signals will be transmitted or received. The modem 502 and/or the communications manager 534 may adjust the frequency of local oscillator A 530 and/or the local oscillator B 532 so that a desired IF and/or RF frequency is produced and used to facilitate processing and transmission of a signal within a desired bandwidth.

In the illustrated architecture 500, signals upconverted by the second mixer 508 are split or duplicated into multiple signals by the splitter 510. The splitter 510 in architecture 500 splits the RF signal into a plurality of identical or nearly identical RF signals, as denoted by its presence in box 528. In other examples, the split may take place with any type of signal including with baseband digital, baseband analog, or IF analog signals. Each of these signals may correspond to an antenna element 520 and the signal travels through and is processed by amplifiers 512, 516, phase shifters 514, and/or other elements corresponding to the respective antenna element 520 to be provided to and transmitted by the corresponding antenna element 520 of the antenna array 518. In one example, the splitter 510 may be an active splitter that is connected to a power supply and provides some gain so that RF signals exiting the splitter 510 are at a power level equal to or greater than the signal entering the splitter 510. In another example, the splitter 510 is a passive splitter that is not connected to power supply and the RF signals exiting the splitter 510 may be at a power level lower than the RF signal entering the splitter 510.

After being split by the splitter 510, the resulting RF signals may enter an amplifier, such as a first amplifier 512, or a phase shifter 514 corresponding to an antenna element 520. The first and second amplifiers 512, 516 are illustrated with dashed lines because one or both of them might not be necessary in some implementations. In one implementation, both the first amplifier 512 and second amplifier 514 are present. In another, neither the first amplifier 512 nor the second amplifier 514 is present. In other implementations, one of the two amplifiers 512, 514 is present but not the other. By way of example, if the splitter 510 is an active splitter, the first amplifier 512 may not be used. By way of further example, if the phase shifter 514 is an active phase shifter that can provide a gain, the second amplifier 516 might not be used.

The amplifiers 512, 516 may provide a desired level of positive or negative gain. A positive gain (positive dB) may be used to increase an amplitude of a signal for radiation by a specific antenna element 520. A negative gain (negative dB) may be used to decrease an amplitude and/or suppress radiation of the signal by a specific antenna element. Each of the amplifiers 512, 516 may be controlled independently (e.g., by the modem 502 or communications manager 534) to provide independent control of the gain for each antenna element 520. For example, the modem 502 and/or the communications manager 534 may have at least one control line connected to each of the splitter 510, first amplifiers 512, phase shifters 514, and/or second amplifiers 516 which may be used to configure a gain to provide a desired amount of gain for each component and thus each antenna element 520.

The phase shifter 514 may provide a configurable phase shift or phase offset to a corresponding RF signal to be transmitted. The phase shifter 514 could be a passive phase shifter not directly connected to a power supply. Passive phase shifters might introduce some insertion loss. The second amplifier 516 could boost the signal to compensate for the insertion loss. The phase shifter 514 could be an active phase shifter connected to a power supply such that the active phase shifter provides some amount of gain or prevents insertion loss. The settings of each of the phase shifters 514 are independent meaning that each can be set to provide a desired amount of phase shift or the same amount of phase shift or some other configuration. The modem 502 and/or the communications manager 534 may have at least one control line connected to each of the phase shifters 514 and which may be used to configure the phase shifters 514 to provide a desired amounts of phase shift or phase offset between antenna elements 520.

In the illustrated architecture 500, RF signals received by the antenna elements 520 are provided to one or more of first amplifier 556 to boost the signal strength. The first amplifier 556 may be connected to the same antenna arrays 518, e.g., for TDD operations. The first amplifier 556 may be connected to different antenna arrays 518. The boosted RF signal is input into one or more of phase shifter 554 to provide a configurable phase shift or phase offset for the corresponding received RF signal. The phase shifter 554 may be an active phase shifter or a passive phase shifter. The settings of the phase shifters 554 are independent, meaning that each can be set to provide a desired amount of phase shift or the same amount of phase shift or some other configuration. The modem 502 and/or the communications manager 534 may have at least one control line connected to each of the phase shifters 554 and which may be used to configure the phase sifters 554 to provide a desired amount of phase shift or phase offset between antenna elements 520.

The outputs of the phase shifters 554 may be input to one or more second amplifiers 552 for signal amplification of the phase shifted received RF signals. The second amplifiers 552 may be individually configured to provide a configured amount of gain. The second amplifiers 552 may be individually configured to provide an amount of gain to ensure that the signal input to combiner 550 have the same magnitude. The amplifiers 552 and/or 556 are illustrated in dashed lines because they might not be necessary in some implementations. In one implementation, both the amplifier 552 and the amplifier 556 are present. In another, neither the amplifier 552 nor the amplifier 556 are present. In other implementations, one of the amplifiers 552, 556 is present but not the other.

In the illustrated architecture 500, signals output by the phase shifters 554 (via the amplifiers 552 when present) are combined in combiner 550. The combiner 550 in architecture combines the RF signal into a signal, as denoted by its presence in box 528. The combiner 550 may be a passive combiner, e.g., not connected to a power source, which may result in some insertion loss. The combiner 550 may be an active combiner, e.g., connected to a power source, which may result in some signal gain. When combiner 550 is an active combiner, it may provide a different (e.g., configurable) amount of gain for each input signal so that the input signals have the same magnitude when they are combined. When combiner 550 is an active combiner, it may not need the second amplifier 552 because the active combiner may provide the signal amplification.

The output of the combiner 550 is input into mixers 548 and 546. Mixers 548 and 546 generally down convert the received RF signal using inputs from local oscillators 572 and 570, respectively, to create intermediate or baseband signals that carry the encoded and modulated information. The output of the mixers 548 and 546 are input into an analog-to-digital converter (ADC) 544 for conversion to analog signals. The analog signals output from ADC 544 is input to modem 502 for baseband processing, e.g., decoding, de-interleaving, etc.

The architecture 500 is given by way of example to illustrate an architecture for transmitting and/or receiving signals. It will be understood that the architecture 500 and/or each portion of the architecture 500 may be repeated multiple times within an architecture to accommodate or provide an arbitrary number of RF chains, antenna elements, and/or antenna panels. Further, numerous alternate architectures are possible and contemplated. For example, although a single antenna array 518 is shown, two, three, or more antenna arrays may be included each with one or more of their own corresponding amplifiers, phase shifters, splitters, mixers, DACs, ADCs, and/or modems. For example, a single UE 115 may include two, four, or more antenna arrays for transmitting or receiving signals at different physical locations on the UE 115 or in different directions.

Further, mixers, splitters, amplifiers, phase shifters and other components may be located in different signal type areas (e.g., different ones of the boxes 522, 524, 526, 528) in different implemented architectures. For example, a split of the signal to be transmitted into a plurality of signals may take place at the analog RF, analog IF, analog baseband, or digital baseband frequencies in different examples. Similarly, amplification, and/or phase shifts may also take place at different frequencies. For example, in some contemplated implementations, one or more of the splitter 510, amplifiers 512, 516, or phase shifters 514 may be located between the DAC 504 and the first mixer 506 or between the first mixer 506 and the second mixer 508. In one example, the functions of one or more of the components may be combined into one component. For example, the phase shifters 514 may perform amplification to include or replace the first and/or or second amplifiers 512, 516. By way of another example, a phase shift may be implemented by the second mixer 508 to obviate the need for a separate phase shifter 514. This technique may sometimes be called local oscillator (LO) phase shifting. In one implementation of this configuration, there may be a plurality of IF to RF mixers (e.g., for each antenna element chain) within the second mixer 508 and the local oscillator B 532 would supply different local oscillator signals (with different phase offsets) to each IF to RF mixer.

The modem 502 and/or the communications manager 534 may control one or more of the other components 504-572 to select one or more antenna elements 520 and/or to form beams for transmission of one or more signals. For example, the antenna elements 520 may be individually selected or deselected for transmission of a signal (or signals) by controlling an amplitude of one or more corresponding amplifiers, such as the first amplifiers 512 and/or the second amplifiers 516. Beamforming includes generation of a beam using a plurality of signals on different antenna elements where one or more or all of the plurality signals are shifted in phase relative to each other. The formed beam may carry physical or higher layer reference signals or information. As each signal of the plurality of signals is radiated from a respective antenna element 520, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 518) can be dynamically controlled by modifying the phase shifts or phase offsets imparted by the phase shifters 514 and amplitudes imparted by the amplifiers 512, 516 of the plurality of signals relative to each other.

In some examples, the communications manager 534 may, when architecture 500 is configured as a receiving device, receive, from a base station, a first DCI comprising a first timing configuration and a trigger of an aperiodic reference signal. The communications manager 534 may transmit, to at least a second UE, the AP-RS on a sidelink channel based at least in part on the trigger received in the first DCI, and may receive, from the at least the second UE, one or more CSI reports comprising CSI parameters derived based at least in part on measurements of the aperiodic reference signal. The communications manager 534 may aggregate the one or more channel state information reports during the first timing configuration. The communications manager 534 may also transmit, to the base station, the aggregated channel state information reports on an uplink channel prior to a termination of the first timing configuration.

In another example, the communications manager 534 may transmit, to the base station, a capability report comprising UE timing capabilities, and may receive, from the base station, a first downlink control information comprising a first timing configuration and a trigger to measure an AP-R. Additionally or alternatively, the communications manager 534 may receive from a second UE, the AP-RS on a first sidelink channel based at least in part on the received first DCI, and may transmit, to the second UE on a second sidelink channel, a CSI report prior to a termination of the first timing configuration.

In yet another example, the communications manager 534 may receive, from a second UE on a first sidelink channel, a first DCI comprising a first timing configuration and a trigger to measure an aperiodic reference signal, and may receive, from the second UE, the AP-RS on a second sidelink channel based at least in part on the received first DCI. Accordingly, the communications manager 534 may transmit, to the second UE on a third sidelink channel, a CSI report prior to a termination of the first timing configuration.

Additionally or alternatively, when architecture 500 is configured as a transmitting device, the communications manager 534 may receive, from a first UE, a capability report comprising UE timing capabilities. The communications manager 534 may also transmit, to the first UE, a first DCI comprising a first timing configuration and a trigger of an AP-RS based at least in part on the capability report. In some cases, the communications manager 534 may receive, from the first UE, an aggregated CSI report of a sidelink channel between the first UE and at least a second UE, the aggregated CSI report received prior to a termination of the first timing configuration.

The communications manager 534 may be located partially or fully within one or more other components of the architecture 500. For example, the communications manager 534 may be located within the modem 502 in at least one implementation.

Figure 6:
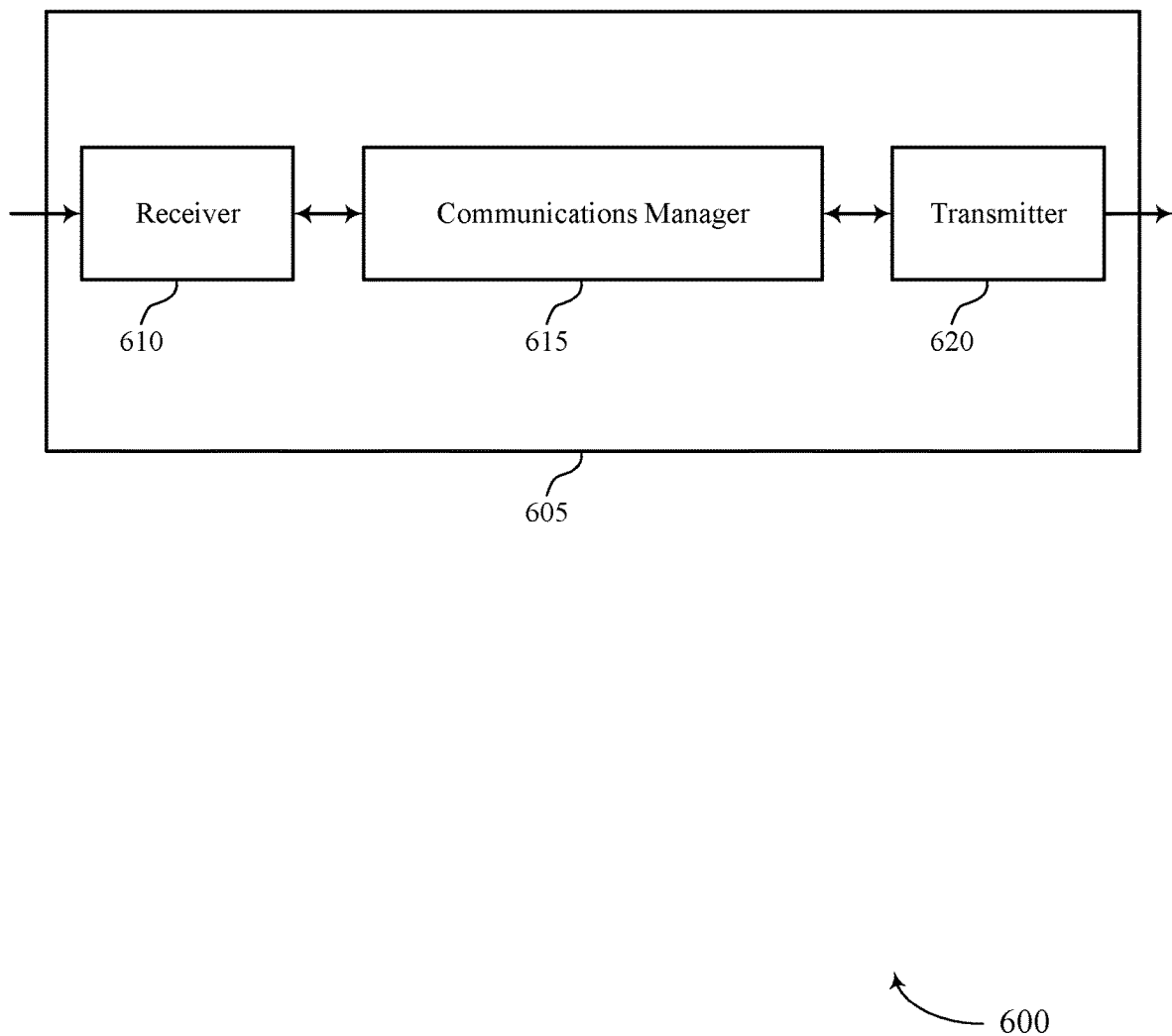
FIGS. 6 and 7 show block diagrams of devices that support timeline considerations for channel state information reporting of a sidelink channel in accordance with aspects of the present disclosure.

FIG. 6 shows a block diagram 600 of a device 605 that supports timeline considerations for channel state information reporting of a sidelink channel in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to timeline considerations for channel state information reporting of a sidelink channel, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may be implemented at a first UE, and may receive, from a base station, a first downlink control information including a first timing configuration and a trigger of an aperiodic reference signal, transmit, to at least a second UE, the aperiodic reference signal on a sidelink channel based on the trigger received in the first downlink control information, receive, from the at least the second UE, one or more channel state information reports including channel state information parameters derived based on measurements of the aperiodic reference signal, aggregate the one or more channel state information reports during the first timing configuration, and transmit, to the base station, the aggregated channel state information reports on an uplink channel prior to a termination of the first timing configuration.

Additionally or Alternatively, the communications manager 615 may be implemented at a sidelink UE, and may transmit, to the base station, a capability report including UE timing capabilities, receive, from the base station, a first timing configuration, receive, from the base station, a first downlink control information including a trigger to measure an aperiodic reference signal based on the first timing configuration, receive, from a second UE, the aperiodic reference signal on a first sidelink channel based on the received first downlink control information, and transmit, to the second UE on a second sidelink channel, a channel state information report prior to a termination of the first timing configuration.

Additionally or Alternatively, the communications manager 615 may be implemented at a sidelink UE, and may receive, from a second UE on a first sidelink channel, a first timing configuration, receive, from the second UE on the first sidelink channel, a first control information (e.g., DCI or sidelink control information) including a trigger to measure an aperiodic reference signal based on the first timing configuration, receive, from the second UE, the aperiodic reference signal on a second sidelink channel based on the received first control information, and transmit, to the second UE on a third sidelink channel, a channel state information report prior to a termination of the first timing configuration. The communications manager 615 may be an example of aspects of the communications manager 910 described herein.

The actions performed by the communications manager 615 as described herein may be implemented to realize one or more potential advantages. For example, transmitting, to the base station 105, the aggregated channel state information reports on an uplink channel prior to a termination of the first timing configuration may allow a UE 115 to coordinate sidelink AP-RS and CSI transmission scheduling for one or more sidelink UEs. This may improve the CSI reception reliability at the UE 115 and base station 105, as the timing requirement can indicate a proper CSI reporting timeline that reduces or avoids excess power consumption by considering the processing capabilities of UE 115. Further, a UE 115 being configured with a reception time window may avoid delays caused by UE 115 waiting for CSI reports from sidelink UEs that are not received within the time window. This supports more efficient reporting at the UE 115.

Based on transmitting a timing requirement, a processor controlling the receiver 610, the communications manager 615, the transmitter 620, etc. of a first UE 115 (e.g., a connected UE 115) may reduce processing resources used for sidelink reception. As such, the first UE 115 may reduce the occurrence of unsuccessful CSI processes performed without a configured timeline. Reducing the number of CSI processes may reduce a number of times the processor ramps up processing power and turns on processing units to handle sidelink AP-RS transmission as well as CSI report reception and decoding.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
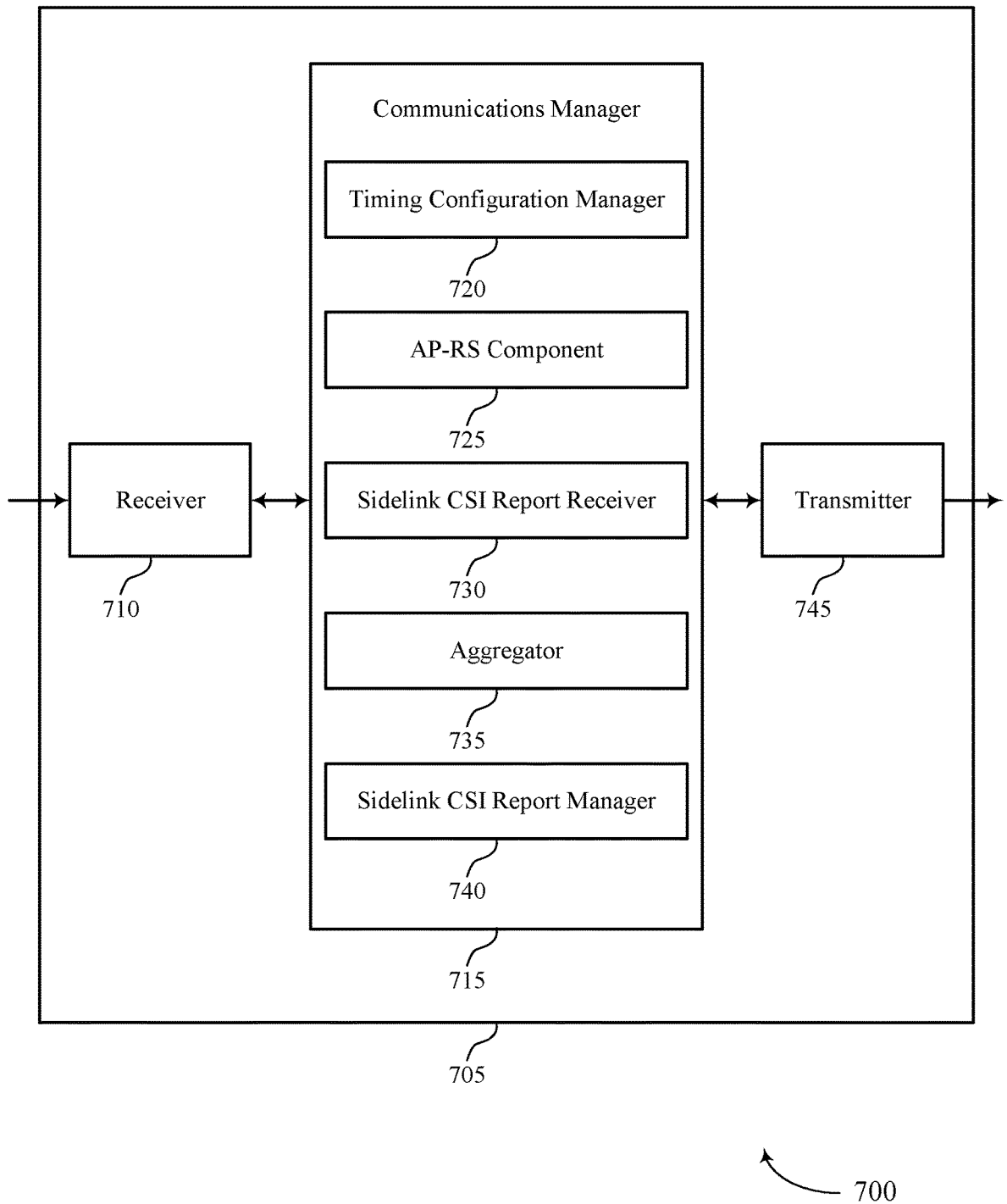

FIG. 7 shows a block diagram 700 of a device 705 that supports timeline considerations for channel state information reporting of a sidelink channel in accordance with aspects of the present disclosure. The device 705 may be an example of aspects of a device 605, or a UE 115 as described herein. The device 705 may include a receiver 710, a communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to timeline considerations for channel state information reporting of a sidelink channel, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a timing configuration manager 720, an AP-RS component 725, a sidelink CSI report receiver 730, an aggregator 735, and a sidelink CSI report manager 740. The communications manager 715 may be an example of aspects of the communications manager 910 described herein.

The Timing Configuration Manager 720 may receive, from a base station, a first timing configuration and a first control information including a trigger of an aperiodic reference signal. The Timing Configuration Manager 720 may receive, from the base station, a first control information including a first timing configuration and a trigger to measure an aperiodic reference signal. The Timing Configuration Manager 720 may receive, from a second UE on a first sidelink channel, a first timing configuration and a first control information including a trigger to measure an aperiodic reference signal.

The AP-RS Component 725 may transmit, to at least a second UE, the aperiodic reference signal on a sidelink channel based on the trigger received in the first control information. The AP-RS Component 725 may receive, from a second UE, the aperiodic reference signal on a first sidelink channel based on the received first control information.

The Sidelink CSI Report Receiver 730 may receive, from the at least the second UE, one or more channel state information reports including channel state information parameters derived based on measurements of the aperiodic reference signal.

The Aggregator 735 may aggregate the one or more channel state information reports during the first timing configuration. The Sidelink CSI Report Manager 740 may transmit, to the base station, the aggregated channel state information reports on an uplink channel prior to a termination of the first timing configuration.

The transmitter 745 may transmit signals generated by other components of the device 705. In some examples, the transmitter 745 may be collocated with a receiver 710 in a transceiver module. For example, the transmitter 745 may be an example of aspects of the transceiver 920 described with reference to FIG. 9. The transmitter 745 may utilize a single antenna or a set of antennas.

Figure 8:
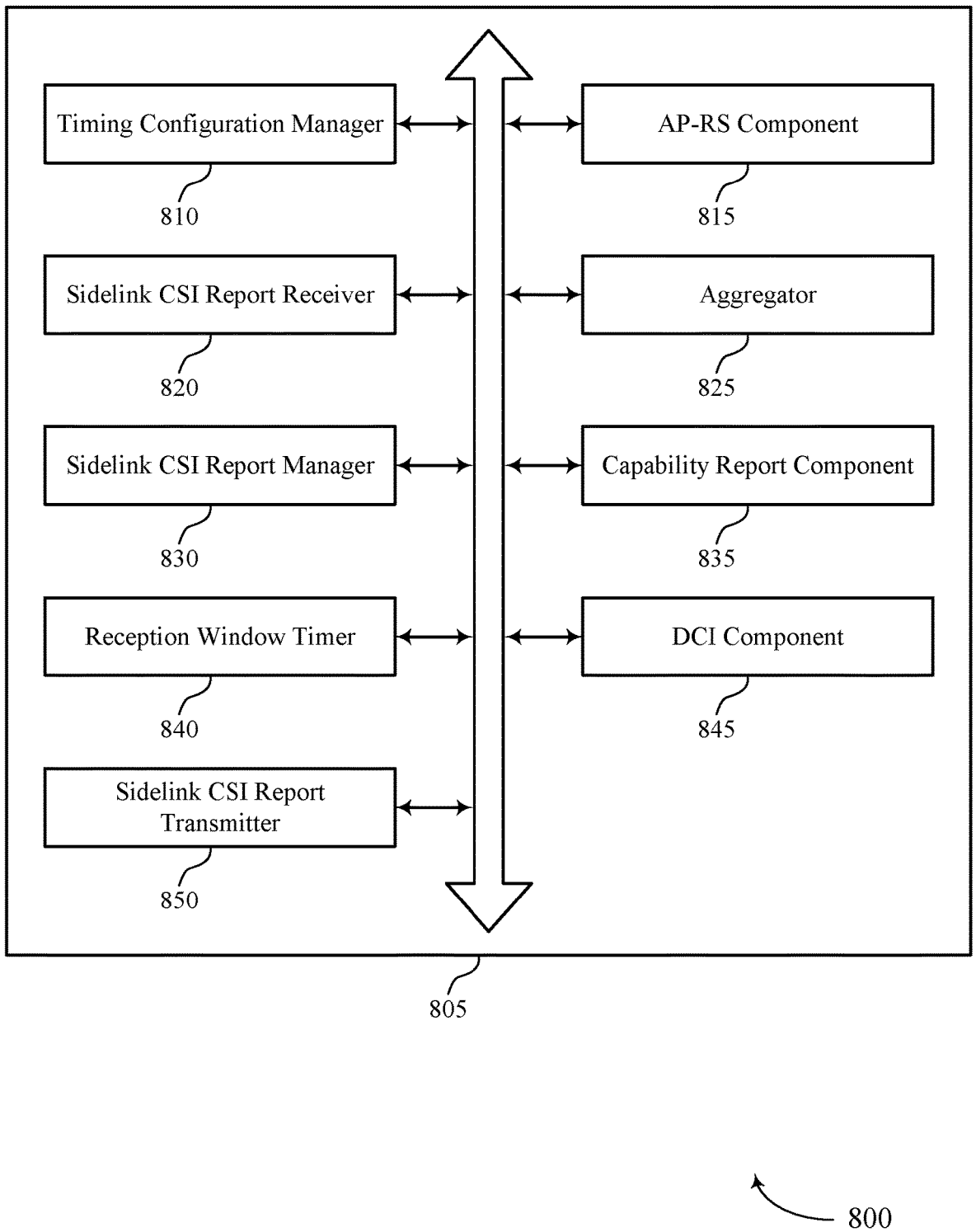
FIG. 8 shows a block diagram of a communications manager that supports timeline considerations for channel state information reporting of a sidelink channel in accordance with aspects of the present disclosure.

FIG. 8 shows a block diagram 800 of a communications manager 805 that supports timeline considerations for channel state information reporting of a sidelink channel in accordance with aspects of the present disclosure. The communications manager 805 may be an example of aspects of a communications manager 615, a communications manager 715, or a communications manager 910 described herein. The communications manager 805 may include a timing configuration manager 810, an AP-RS component 815, a sidelink CSI report receiver 820, an aggregator 825, a sidelink CSI report manager 830, a capability report component 835, a reception window timer 840, a DCI component 845, and a sidelink CSI report transmitter 850. Each of these modules may communicate, directly or indirectly, with one another (e.g., via one or more buses).

The Timing Configuration Manager 810 may receive, from a base station, a first timing configuration and a first downlink control information including a trigger of an aperiodic reference signal. In some examples, the Timing Configuration Manager 810 may receive, from the base station, a first downlink control information including a first timing configuration and a trigger to measure an aperiodic reference signal. In some examples, the Timing Configuration Manager 810 may receive, from a second UE on a first sidelink channel, a first timing configuration and a first control information including and a trigger to measure an aperiodic reference signal.

In some cases, the first timing configuration defines a time period for the first UE to transmit the aggregated CSI reports with respect to when the first UE receives the one or more CSI reports. In some cases, the first timing configuration defines a time period for the first UE to transmit the aggregated CSI reports with respect to when the first UE receives the first DCI. In some cases, the first timing configuration defines a time period for the second UE to transmit, to the base station, aggregated CSI reports with respect to when the second UE receives the CSI report. In some cases, the first DCI triggers the transmission of the CSI report to the second UE from a set of UEs.

The AP-RS Component 815 may transmit, to at least a second UE, the aperiodic reference signal on a sidelink channel based on the trigger received in the first control information. In some examples, the AP-RS Component 815 may receive, from a second UE, the aperiodic reference signal on a first or a second sidelink channel based on the received first control information. In some cases, the first DCI and the AP-RS are in a same slot, or the first DCI is in a first slot that occurs prior to a second slot including the AP-RS.

The Sidelink CSI Report Receiver 820 may receive, from the at least the second UE, one or more channel state information reports including channel state information parameters derived based on measurements of the aperiodic reference signal. The Aggregator 825 may aggregate the one or more channel state information reports during the first timing configuration.

The Sidelink CSI Report Manager 830 may transmit, to the base station, the aggregated channel state information reports on an uplink channel prior to a termination of the first timing configuration. In some examples, the Sidelink CSI Report Manager 830 may refrain from transmitting the aggregated CSI reports when the first timing configuration is shorter than the reported UE timing capabilities. In some examples, the Sidelink CSI Report Manager 830 may transmit, to the base station, one or more false aggregated CSI reports on the uplink channel prior to the termination of the first timing configuration when the first timing configuration is shorter than the reported UE timing capabilities. In some examples, the Sidelink CSI Report Manager 830 may drop the aggregated CSI reports when the first timing configuration is shorter than the reported UE timing capabilities.

In some cases, the sidelink includes a PSSCH, and the uplink channel includes the PSSCH, a PUSCH, a PUCCH, or a PSFCH. In some cases, the first sidelink channel includes a PSSCH, and the second sidelink channel includes the PSSCH or a PSFCH.

The Capability Report Component 835 may transmit, to the base station, a capability report including UE timing capabilities. In some cases, the first timing configuration is based on a capability of the first UE and/or a capability of the second UE.

The Reception Window Timer 840 may receive the one or more CSI reports within a reception time window based on the received first DCI. In some examples, the Reception Window Timer 840 may aggregate the one or more CSI reports received within the reception time window. In some examples, the Reception Window Timer 840 may drop one or more CSI reports received after the termination of the reception time window. In some examples, the Reception Window Timer 840 may transmit, to the base station, false aggregated CSI reports on the uplink channel prior to the termination of the first timing configuration for the one or more CSI reports received after the termination of the reception time window.

The DCI Component 845 may receive, from the base station, an indication to transmit a second DCI based on a coverage status of the second UE. In some examples, the DCI Component 845 may transmit, to the second UE on the sidelink channel, the second DCI including a trigger to measure the aperiodic reference signal, where the second DCI is transmitted based on the received indication. In some cases, the second UE is located out of coverage of the base station.

The Sidelink CSI Report Transmitter 850 may transmit, to the second UE on a second sidelink channel, a channel state information report prior to a termination of the first timing configuration. In some examples, the Sidelink CSI Report Transmitter 850 may transmit, to the second UE on a third sidelink channel, a channel state information report prior to a termination of the first timing configuration.

Figure 9:
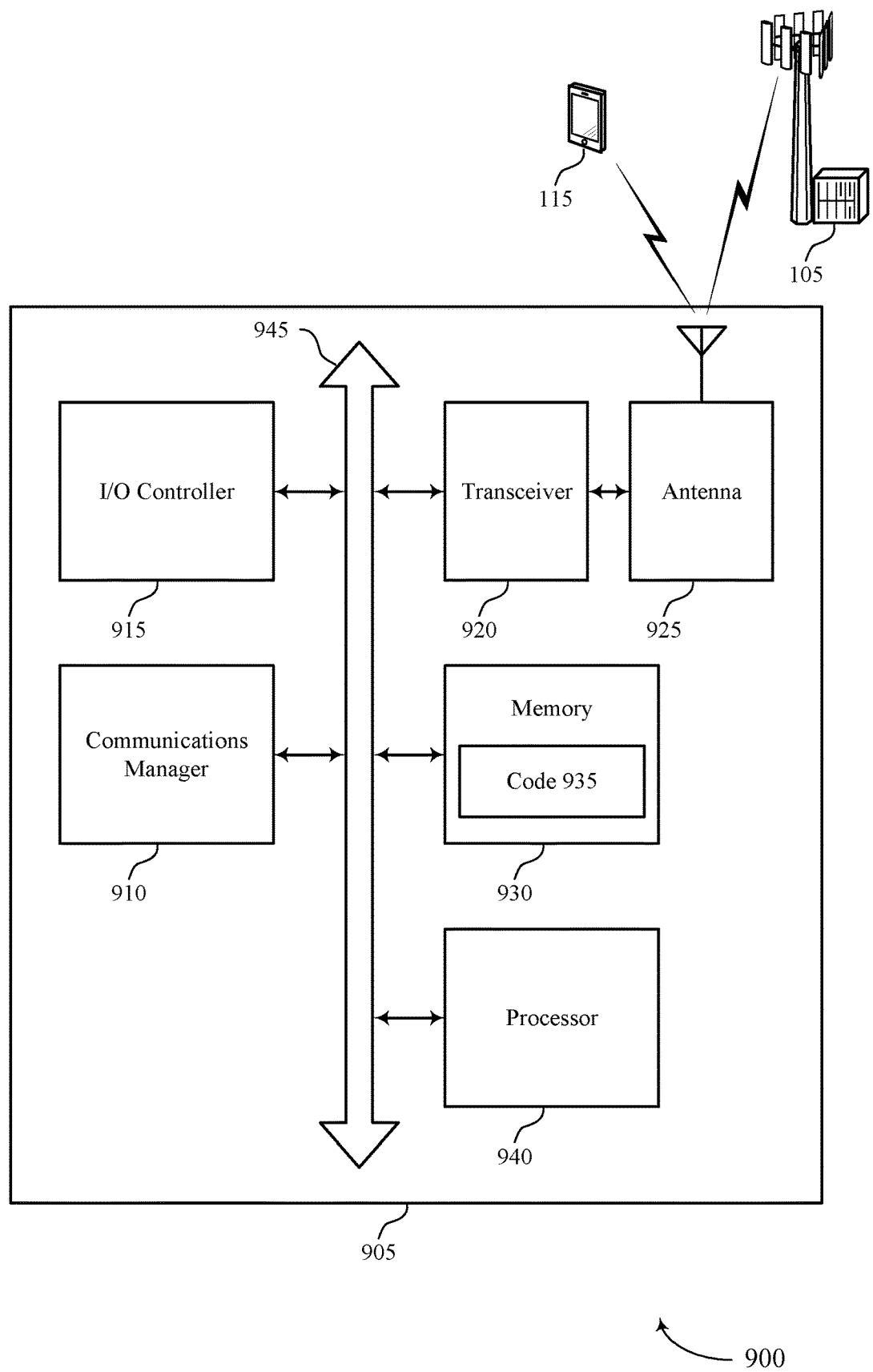
FIG. 9 shows a diagram of a system including a device that supports timeline considerations for channel state information reporting of a sidelink channel in accordance with aspects of the present disclosure.

FIG. 9 shows a diagram of a system 900 including a device 905 that supports timeline considerations for channel state information reporting of a sidelink channel in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, a first downlink control information including a first timing configuration and a trigger of an aperiodic reference signal, transmit, to at least a second UE, the aperiodic reference signal on a sidelink channel based on the trigger received in the first downlink control information, receive, from the at least the second UE, one or more channel state information reports including channel state information parameters derived based on measurements of the aperiodic reference signal, aggregate the one or more channel state information reports during the first timing configuration, and transmit, to the base station, the aggregated channel state information reports on an uplink channel prior to a termination of the first timing configuration.

The communications manager 910 may also transmit, to the base station, a capability report including UE timing capabilities, receive, from the base station, a first downlink control information including a first timing configuration and a trigger to measure an aperiodic reference signal, receive, from a second UE, the aperiodic reference signal on a first sidelink channel based on the received first downlink control information, and transmit, to the second UE on a second sidelink channel, a channel state information report prior to a termination of the first timing configuration.

The communications manager 910 may also receive, from a second UE on a first sidelink channel, a first downlink control information including a first timing configuration and a trigger to measure an aperiodic reference signal, receive, from the second UE, the aperiodic reference signal on a second sidelink channel based on the received first downlink control information, and transmit, to the second UE on a third sidelink channel, a channel state information report prior to a termination of the first timing configuration.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting timeline considerations for channel state information reporting of a sidelink channel).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
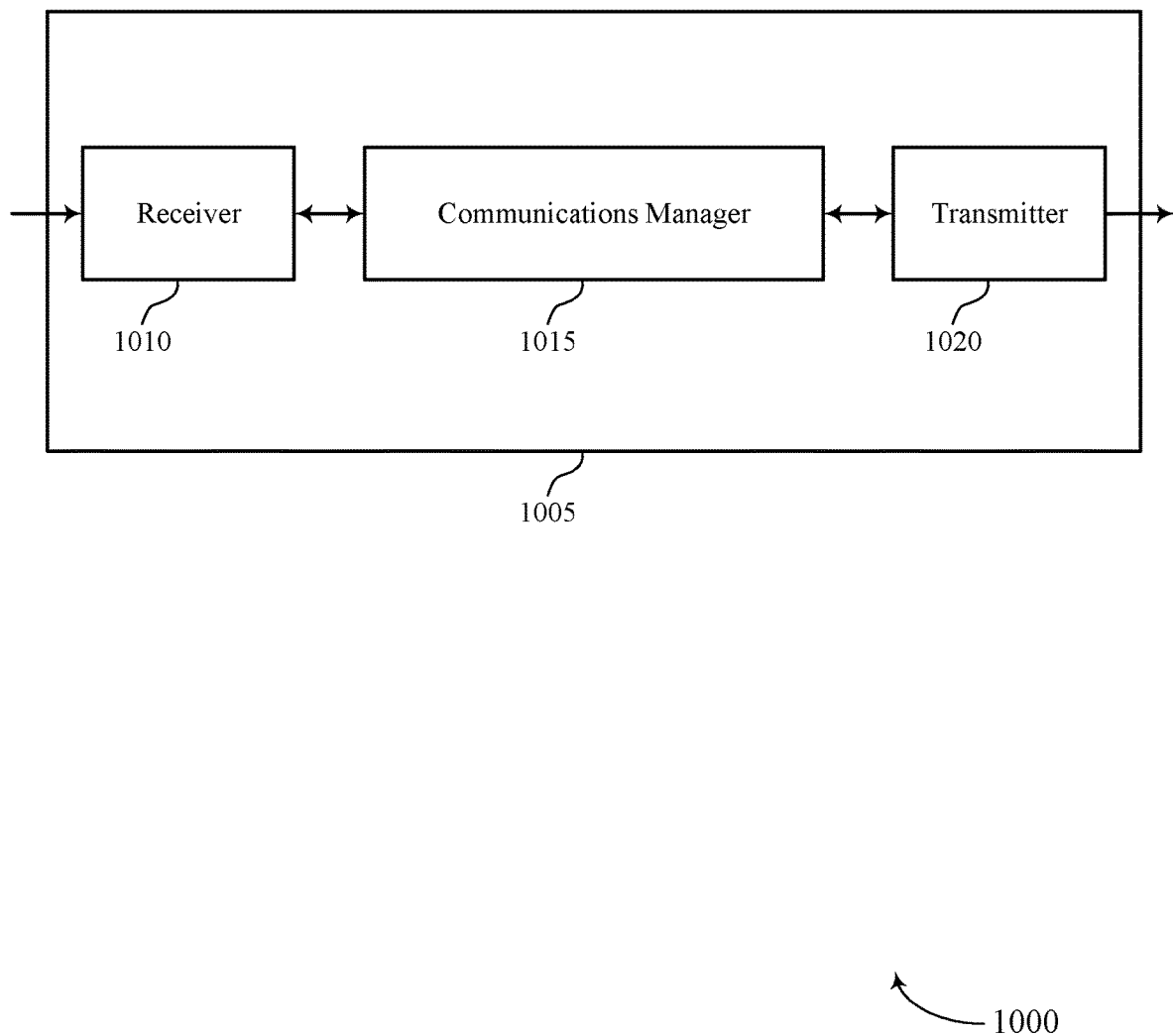
FIGS. 10 and 11 show block diagrams of devices that support timeline considerations for channel state information reporting of a sidelink channel in accordance with aspects of the present disclosure.

FIG. 10 shows a block diagram 1000 of a device 1005 that supports timeline considerations for channel state information reporting of a sidelink channel in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to timeline considerations for channel state information reporting of a sidelink channel, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive, from a first UE, a capability report including UE timing capabilities, transmit, to the first UE, a first downlink control information including a first timing configuration and a trigger of an aperiodic reference signal based on the capability report, and receive, from the first UE, an aggregated channel state information report of a sidelink channel between the first UE and at least a second UE, the aggregated channel state information report received prior to a termination of the first timing configuration. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
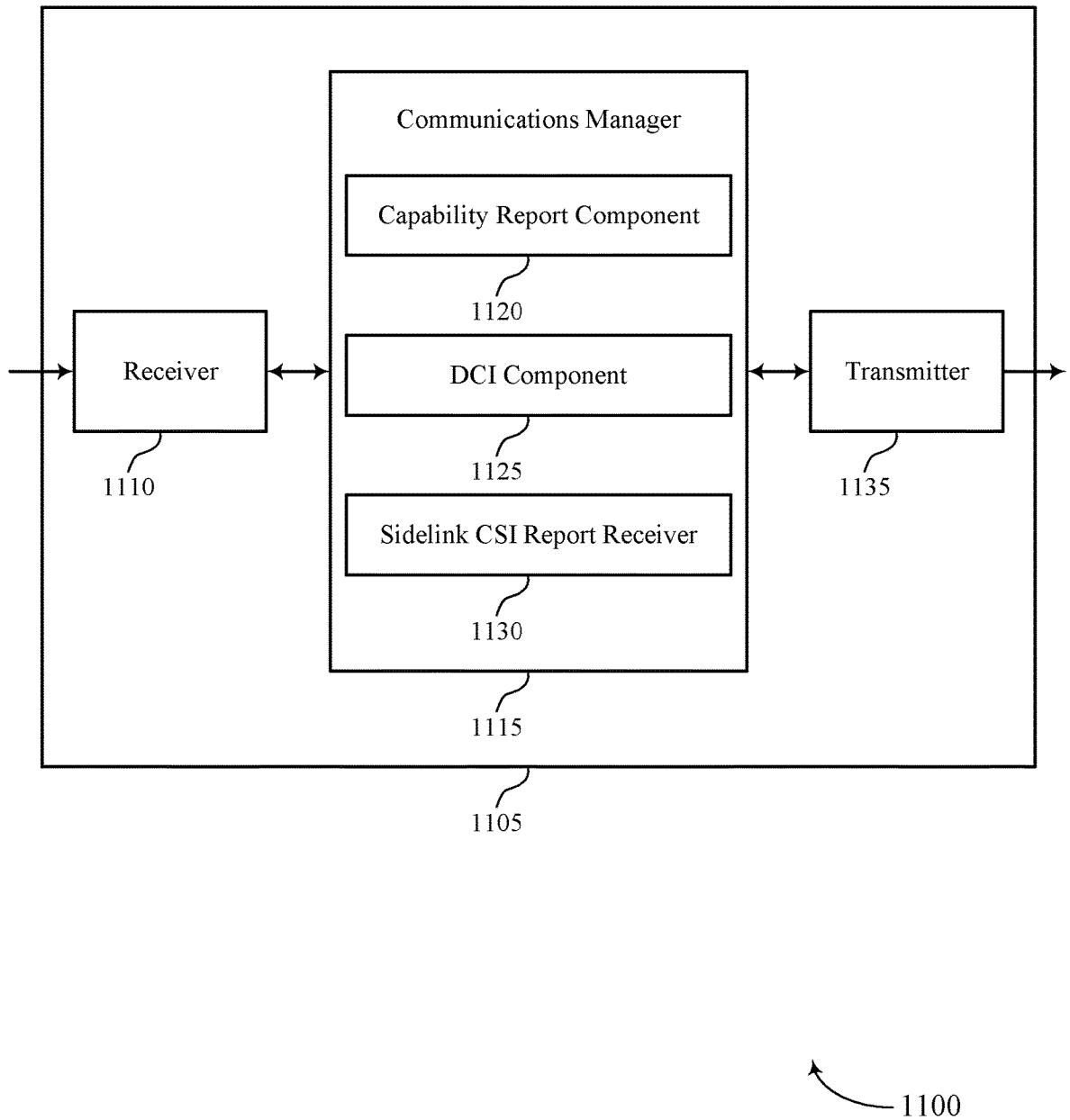

FIG. 11 shows a block diagram 1100 of a device 1105 that supports timeline considerations for channel state information reporting of a sidelink channel in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to timeline considerations for channel state information reporting of a sidelink channel, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a capability report component 1120, a DCI component 1125, and a sidelink CSI report receiver 1130. The communications manager 1115 may be an example of aspects of the communications manager 1310 described herein.

The Capability Report Component 1120 may receive, from a first UE, a capability report including UE timing capabilities. The DCI Component 1125 may transmit, to the first UE, a first downlink control information including a first timing configuration and a trigger of an aperiodic reference signal based on the capability report. The Sidelink CSI Report Receiver 1130 may receive, from the first UE, an aggregated channel state information report of a sidelink channel between the first UE and at least a second UE, the aggregated channel state information report received prior to a termination of the first timing configuration.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
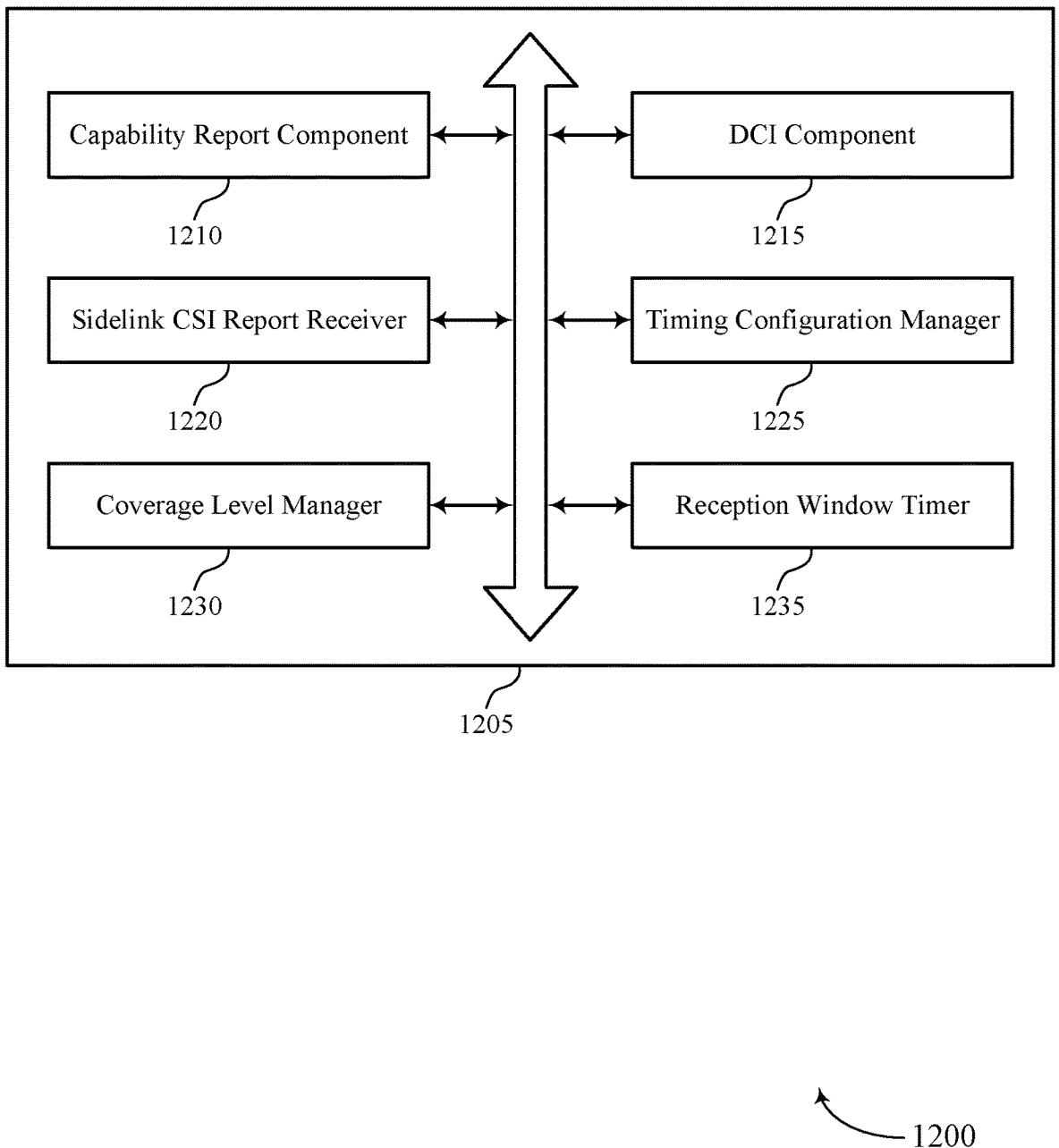
FIG. 12 shows a block diagram of a communications manager that supports timeline considerations for channel state information reporting of a sidelink channel in accordance with aspects of the present disclosure.

FIG. 12 shows a block diagram 1200 of a communications manager 1205 that supports timeline considerations for channel state information reporting of a sidelink channel in accordance with aspects of the present disclosure. The communications manager 1205 may be an example of aspects of a communications manager 1015, a communications manager 1115, or a communications manager 1310 described herein. The communications manager 1205 may include a capability report component 1210, a DCI component 1215, a sidelink CSI report receiver 1220, a timing configuration manager 1225, a coverage level manager 1230, and a reception window timer 1235. Each of these modules may communicate, directly or indirectly, with one another (e.g., via one or more buses).

The Capability Report Component 1210 may receive, from a first UE, a capability report including UE timing capabilities. The DCI Component 1215 may transmit, to the first UE, a first downlink control information including a first timing configuration and a trigger of an aperiodic reference signal based on the capability report. In some examples, the DCI Component 1215 may transmit, to the second UE, a second DCI including the first timing configuration and a trigger to measure the aperiodic reference signal. In some cases, the first DCI is the same as the second DCI. In some cases, the first DCI is different from the second DCI. In some cases, the second DCI and the aperiodic reference signal are in a same slot, or the second DCI is in a first slot that occurs prior to a second slot including the aperiodic reference signal. In some cases, the second UE is in a partial coverage mode with the base station.

The Sidelink CSI Report Receiver 1220 may receive, from the first UE, an aggregated channel state information report of a sidelink channel between the first UE and at least a second UE, the aggregated channel state information report received prior to a termination of the first timing configuration. In some cases, the sidelink channel includes a physical sidelink shared channel (PSSCH) or a physical sidelink feedback channel (PSFCH).

The Timing Configuration Manager 1225 may determine the first timing configuration based on a capability of the first UE and a capability of at least the second UE, where the aggregated CSI report includes one or more false CSI reports when the first timing configuration is shorter than the reported UE timing capabilities. In some cases, the first timing configuration defines a time period for the first UE to transmit the aggregated CSI reports with respect to when the first UE receives the one or more CSI reports. In some cases, the first timing configuration defines a time period for the first UE to transmit the aggregated CSI reports with respect to when the first UE receives the first DCI.

The Coverage Level Manager 1230 may transmit, to the first UE, an indication to transmit a second DCI to the second UE based on the second UE being out of coverage from the base station. The Reception Window Timer 1235 may transmit, to the first UE, a reception time window configuration associated with a time period for the first UE to receive one or more CSI reports with respect to when the first UE transmits the aperiodic reference signal.

Figure 13:
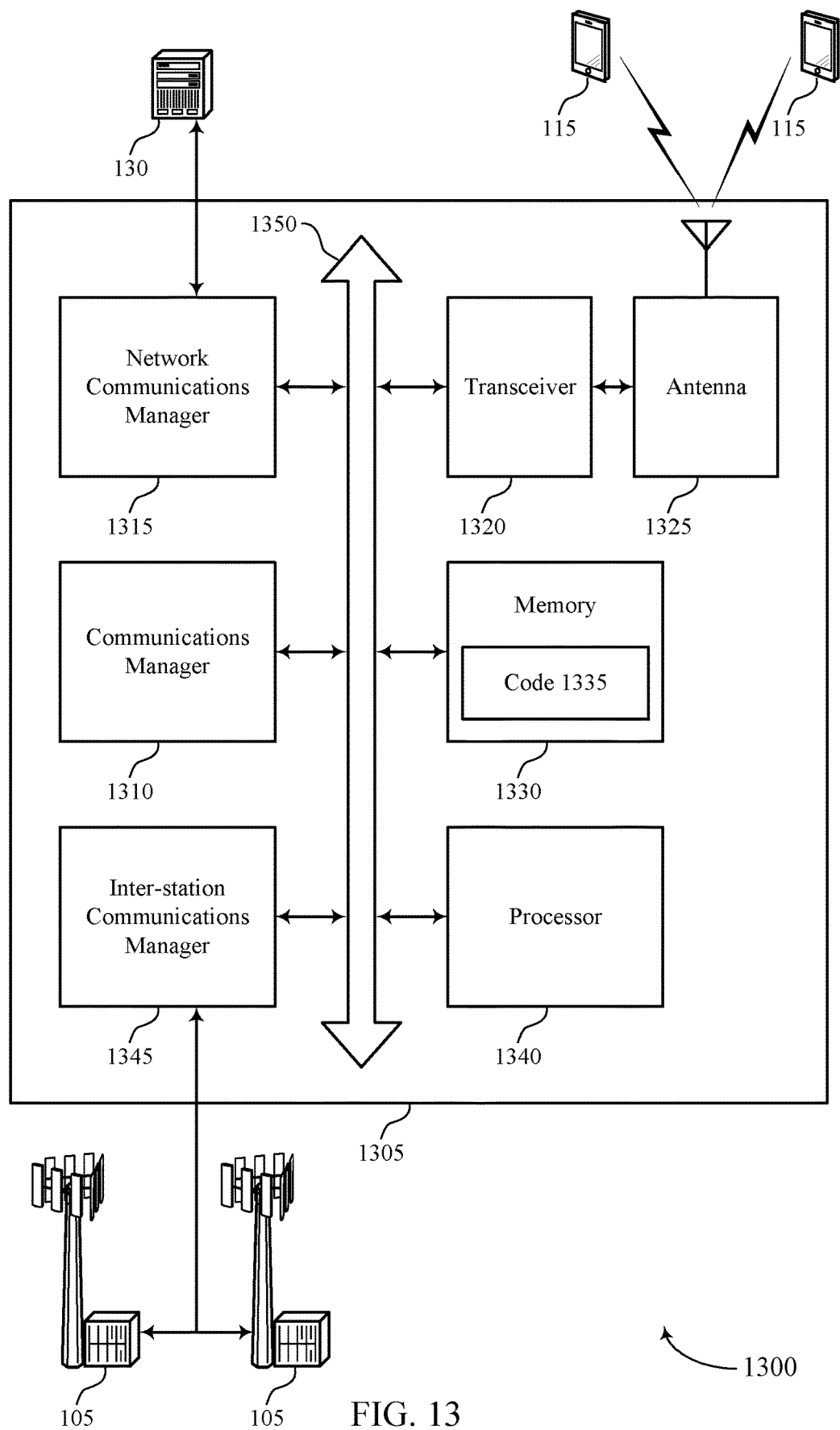
FIG. 13 shows a diagram of a system including a device that supports timeline considerations for channel state information reporting of a sidelink channel in accordance with aspects of the present disclosure.

FIG. 13 shows a diagram of a system 1300 including a device 1305 that supports timeline considerations for channel state information reporting of a sidelink channel in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may receive, from a first UE, a capability report including UE timing capabilities, transmit, to the first UE, a first downlink control information including a first timing configuration and a trigger of an aperiodic reference signal based on the capability report, and receive, from the first UE, an aggregated channel state information report of a sidelink channel between the first UE and at least a second UE, the aggregated channel state information report received prior to a termination of the first timing configuration.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting timeline considerations for channel state information reporting of a sidelink channel).

The inter-station communications manager 1345 may manage communications with other base station 105 and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
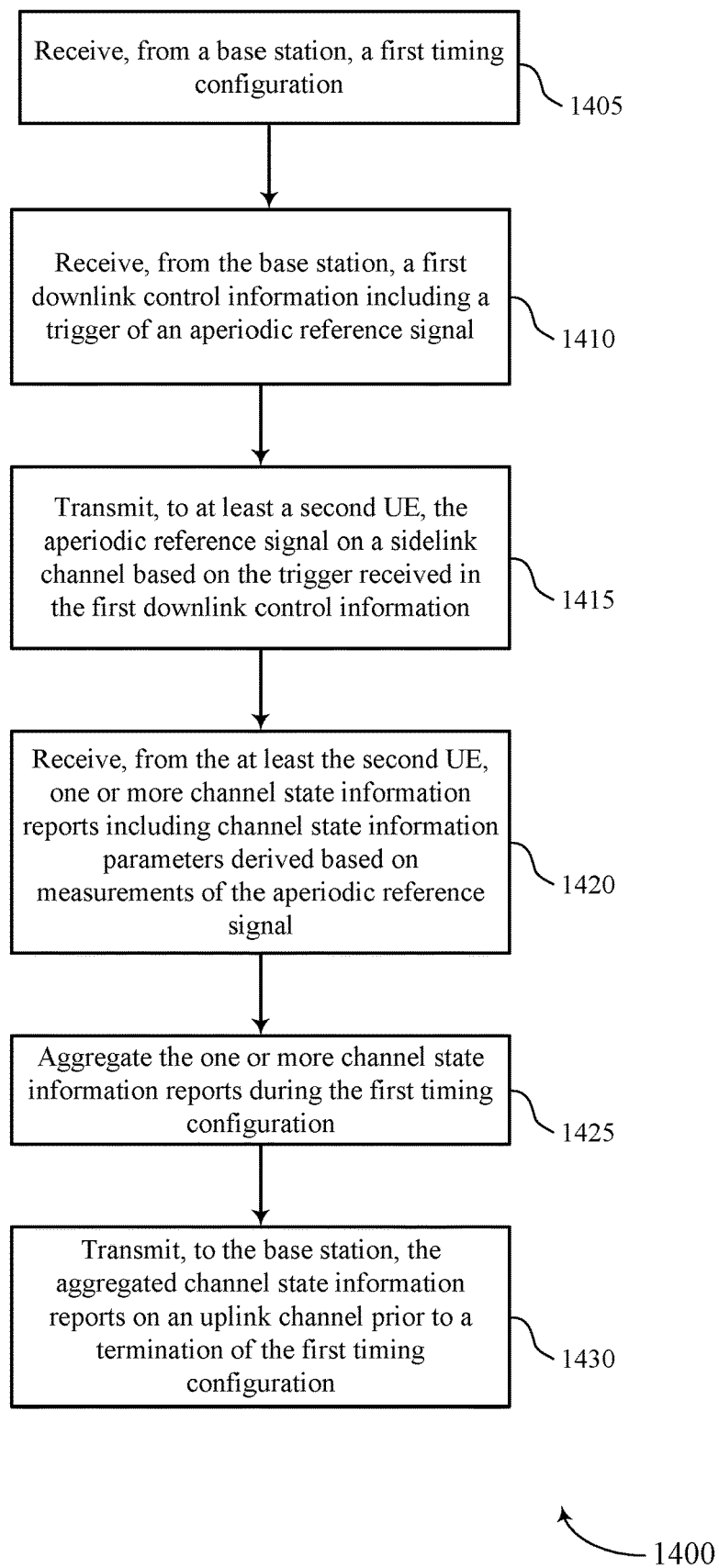
FIGS. 14 through 21 show flowcharts illustrating methods that support timeline considerations for channel state information reporting of a sidelink channel in accordance with aspects of the present disclosure.

FIG. 14 shows a flowchart illustrating a method 1400 that supports timeline considerations for channel state information reporting of a sidelink channel in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may receive, from a base station, a first downlink control information including a first timing configuration and a trigger of an aperiodic reference signal. The operations of 1405 may be performed according to the methods described herein. In some examples, aspects of the operations of 1405 may be performed by a Timing Configuration Manager as described with reference to FIGS. 6 through 9.

At 1410, the UE may receive, from a base station, a first downlink control information including a trigger of an aperiodic reference signal based on the first timing configuration. The operations of 1410 may be performed according to the methods described herein. In some examples, aspects of the operations of 1410 may be performed by a Timing Configuration Manager as described with reference to FIGS. 6 through 9.

At 1415, the UE may transmit, to at least a second UE, the aperiodic reference signal on a sidelink channel based on the trigger received in the first downlink control information. The operations of 1415 may be performed according to the methods described herein. In some examples, aspects of the operations of 1415 may be performed by an AP-RS Component as described with reference to FIGS. 6 through 9.

At 1420, the UE may receive, from the at least the second UE, one or more channel state information reports including channel state information parameters derived based on measurements of the aperiodic reference signal. The operations of 1420 may be performed according to the methods described herein. In some examples, aspects of the operations of 1420 may be performed by a Sidelink CSI Report Receiver as described with reference to FIGS. 6 through 9.

At 1425, the UE may aggregate the one or more channel state information reports during the first timing configuration. The operations of 1425 may be performed according to the methods described herein. In some examples, aspects of the operations of 1425 may be performed by an Aggregator as described with reference to FIGS. 6 through 9.

At 1430, the UE may transmit, to the base station, the aggregated channel state information reports on an uplink channel prior to a termination of the first timing configuration. The operations of 1430 may be performed according to the methods described herein. In some examples, aspects of the operations of 1430 may be performed by a Sidelink CSI Report Manager as described with reference to FIGS. 6 through 9.

Figure 15:
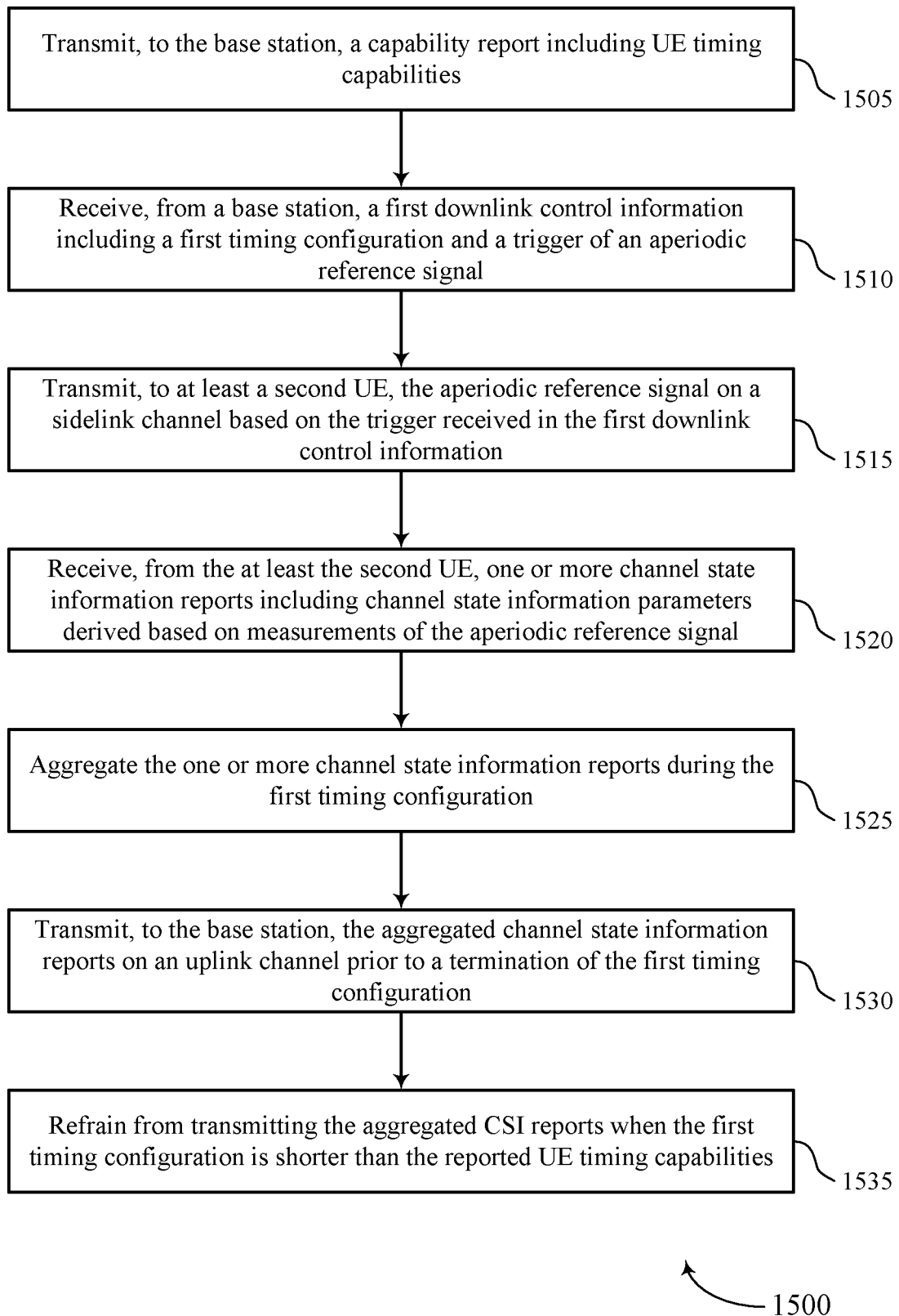

FIG. 15 shows a flowchart illustrating a method 1500 that supports timeline considerations for channel state information reporting of a sidelink channel in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may transmit, to the base station, a capability report including UE timing capabilities. The operations of 1505 may be performed according to the methods described herein. In some examples, aspects of the operations of 1505 may be performed by a Capability Report Component as described with reference to FIGS. 6 through 9.

At 1510, the UE may receive, from a base station, a first downlink control information including a first timing configuration and a trigger of an aperiodic reference signal. The operations of 1510 may be performed according to the methods described herein. In some examples, aspects of the operations of 1510 may be performed by a Timing Configuration Manager as described with reference to FIGS. 6 through 9.

At 1515, the UE may transmit, to at least a second UE, the aperiodic reference signal on a sidelink channel based on the trigger received in the first downlink control information. The operations of 1515 may be performed according to the methods described herein. In some examples, aspects of the operations of 1515 may be performed by an AP-RS Component as described with reference to FIGS. 6 through 9.

At 1520, the UE may receive, from the at least the second UE, one or more channel state information reports including channel state information parameters derived based on measurements of the aperiodic reference signal. The operations of 1520 may be performed according to the methods described herein. In some examples, aspects of the operations of 1520 may be performed by a Sidelink CSI Report Receiver as described with reference to FIGS. 6 through 9.

At 1525, the UE may aggregate the one or more channel state information reports during the first timing configuration. The operations of 1525 may be performed according to the methods described herein. In some examples, aspects of the operations of 1525 may be performed by an Aggregator as described with reference to FIGS. 6 through 9.

At 1530, the UE may transmit, to the base station, the aggregated channel state information reports on an uplink channel prior to a termination of the first timing configuration. The operations of 1530 may be performed according to the methods described herein. In some examples, aspects of the operations of 1530 may be performed by a Sidelink CSI Report Manager as described with reference to FIGS. 6 through 9.

At 1535, the UE may refrain from transmitting the aggregated CSI reports when the first timing configuration is shorter than the reported UE timing capabilities. The operations of 1535 may be performed according to the methods described herein. In some examples, aspects of the operations of 1535 may be performed by a Sidelink CSI Report Manager as described with reference to FIGS. 6 through 9.

Figure 16:
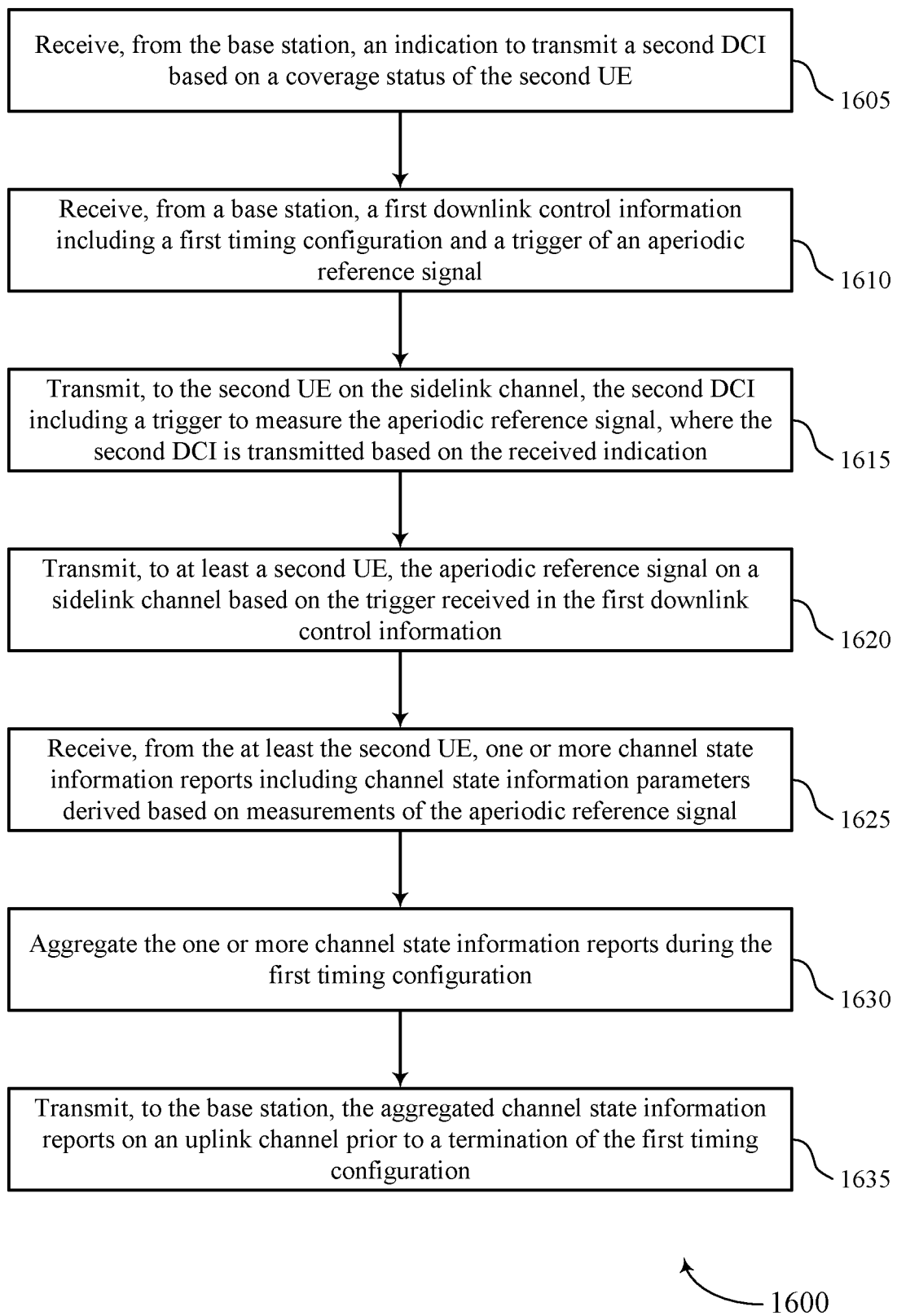

FIG. 16 shows a flowchart illustrating a method 1600 that supports timeline considerations for channel state information reporting of a sidelink channel in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1605, the UE may receive, from the base station, an indication to transmit a second DCI based on a coverage status of the second UE. The operations of 1605 may be performed according to the methods described herein. In some examples, aspects of the operations of 1605 may be performed by a DCI Component as described with reference to FIGS. 6 through 9.

At 1610, the UE may receive, from a base station, a first downlink control information including a first timing configuration and a trigger of an aperiodic reference signal. The operations of 1610 may be performed according to the methods described herein. In some examples, aspects of the operations of 1610 may be performed by a Timing Configuration Manager as described with reference to FIGS. 6 through 9.

At 1615, the UE may transmit, to the second UE on the sidelink channel, the second DCI including a trigger to measure the aperiodic reference signal, where the second DCI is transmitted based on the received indication. The operations of 1615 may be performed according to the methods described herein. In some examples, aspects of the operations of 1615 may be performed by a DCI Component as described with reference to FIGS. 6 through 9.

At 1620, the UE may transmit, to at least a second UE, the aperiodic reference signal on a sidelink channel based on the trigger received in the first downlink control information. The operations of 1620 may be performed according to the methods described herein. In some examples, aspects of the operations of 1620 may be performed by an AP-RS Component as described with reference to FIGS. 6 through 9.

At 1625, the UE may receive, from the at least the second UE, one or more channel state information reports including channel state information parameters derived based on measurements of the aperiodic reference signal. The operations of 1625 may be performed according to the methods described herein. In some examples, aspects of the operations of 1625 may be performed by a Sidelink CSI Report Receiver as described with reference to FIGS. 6 through 9.

At 1630, the UE may aggregate the one or more channel state information reports during the first timing configuration. The operations of 1630 may be performed according to the methods described herein. In some examples, aspects of the operations of 1630 may be performed by an Aggregator as described with reference to FIGS. 6 through 9.

At 1635, the UE may transmit, to the base station, the aggregated channel state information reports on an uplink channel prior to a termination of the first timing configuration. The operations of 1635 may be performed according to the methods described herein. In some examples, aspects of the operations of 1635 may be performed by a Sidelink CSI Report Manager as described with reference to FIGS. 6 through 9.

Figure 17:
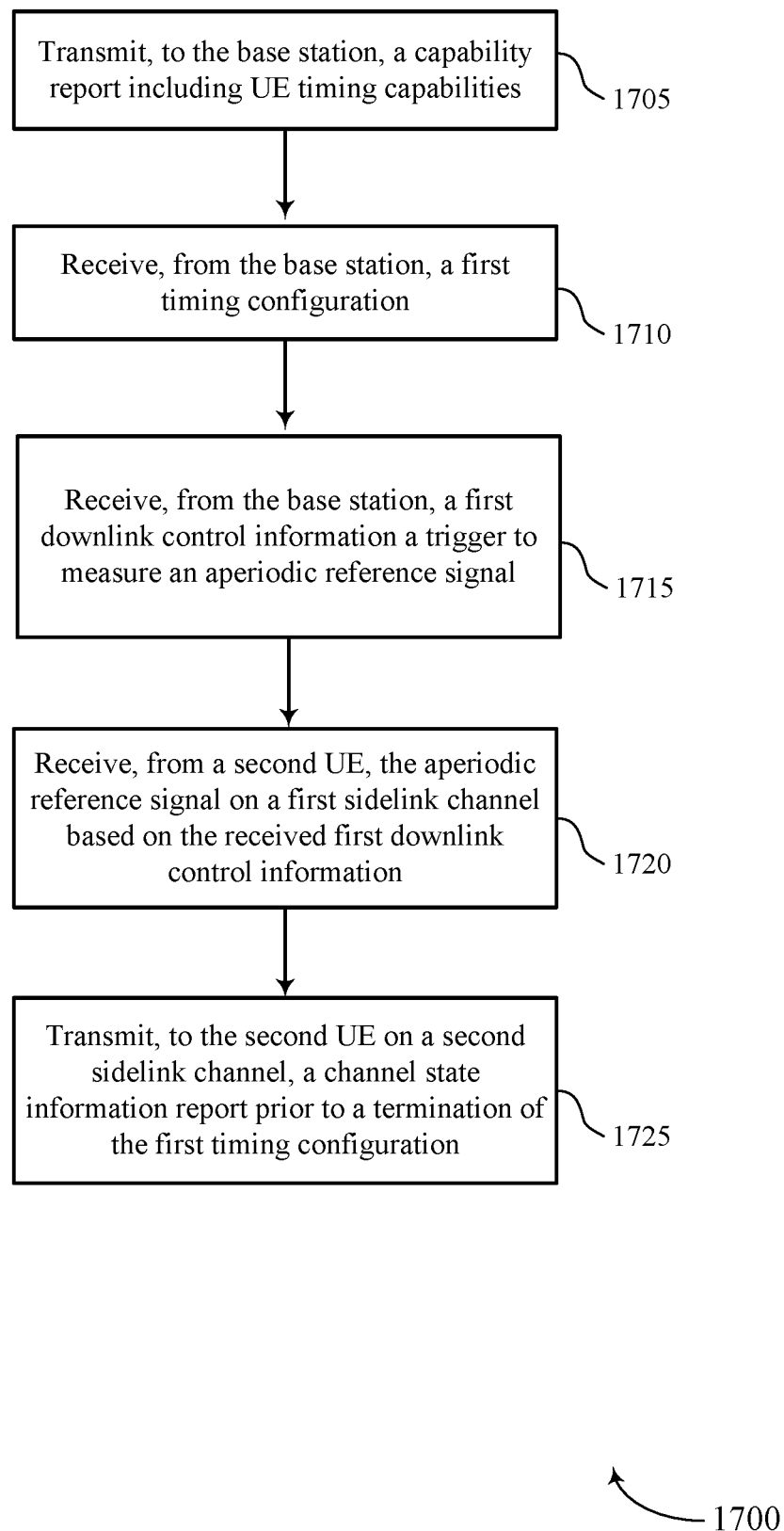

FIG. 17 shows a flowchart illustrating a method 1700 that supports timeline considerations for channel state information reporting of a sidelink channel in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1705, the UE may transmit, to the base station, a capability report including UE timing capabilities. The operations of 1705 may be performed according to the methods described herein. In some examples, aspects of the operations of 1705 may be performed by a Capability Report Component as described with reference to FIGS. 6 through 9.

At 1710, the UE may receive, from the base station, a first timing configuration. The operations of 1710 may be performed according to the methods described herein. In some examples, aspects of the operations of 1710 may be performed by a Timing Configuration Manager as described with reference to FIGS. 6 through 9.

At 1715, the UE may receive, from the base station, a first downlink control information including a trigger to measure an aperiodic reference signal based on the first timing configuration. The operations of 1710 may be performed according to the methods described herein. In some examples, aspects of the operations of 1710 may be performed by a Timing Configuration Manager as described with reference to FIGS. 6 through 9.

At 1720, the UE may receive, from a second UE, the aperiodic reference signal on a first sidelink channel based on the received first downlink control information. The operations of 1720 may be performed according to the methods described herein. In some examples, aspects of the operations of 1720 may be performed by an AP-RS Component as described with reference to FIGS. 6 through 9.

At 1725, the UE may transmit, to the second UE on a second sidelink channel, a channel state information report prior to a termination of the first timing configuration. The operations of 1725 may be performed according to the methods described herein. In some examples, aspects of the operations of 1725 may be performed by a Sidelink CSI Report Transmitter as described with reference to FIGS. 6 through 9.

Figure 18:
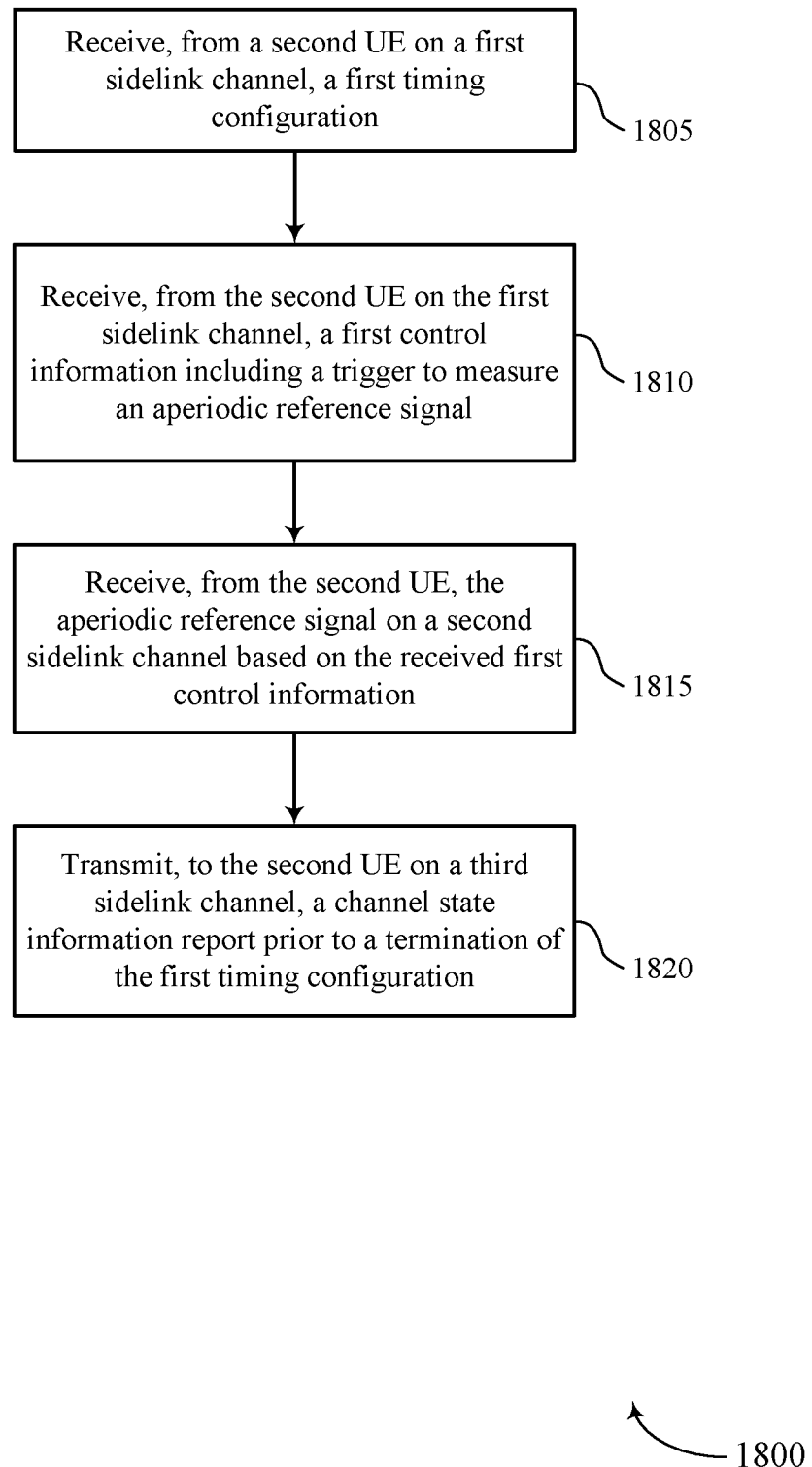

FIG. 18 shows a flowchart illustrating a method 1800 that supports timeline considerations for channel state information reporting of a sidelink channel in accordance with aspects of the present disclosure. The operations of method 1800 may be implemented by a UE 115 or its components as described herein. For example, the operations of method 1800 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1805, the UE may receive, from a second UE on a first sidelink channel, a first timing configuration. The operations of 1805 may be performed according to the methods described herein. In some examples, aspects of the operations of 1805 may be performed by a Timing Configuration Manager as described with reference to FIGS. 6 through 9.

At 1810, the UE may receive, from the second UE on the first sidelink channel, a first control information including a trigger to measure an aperiodic reference signal based on the first timing configuration. The operations of 1810 may be performed according to the methods described herein. In some examples, aspects of the operations of 1810 may be performed by a Timing Configuration Manager as described with reference to FIGS. 6 through 9.

At 1815, the UE may receive, from the second UE, the aperiodic reference signal on a second sidelink channel based on the received first control information. The operations of 1815 may be performed according to the methods described herein. In some examples, aspects of the operations of 1815 may be performed by an AP-RS Component as described with reference to FIGS. 6 through 9.

At 1820, the UE may transmit, to the second UE on a third sidelink channel, a channel state information report prior to a termination of the first timing configuration. The operations of 1820 may be performed according to the methods described herein. In some examples, aspects of the operations of 1820 may be performed by a Sidelink CSI Report Transmitter as described with reference to FIGS. 6 through 9.

Figure 19:
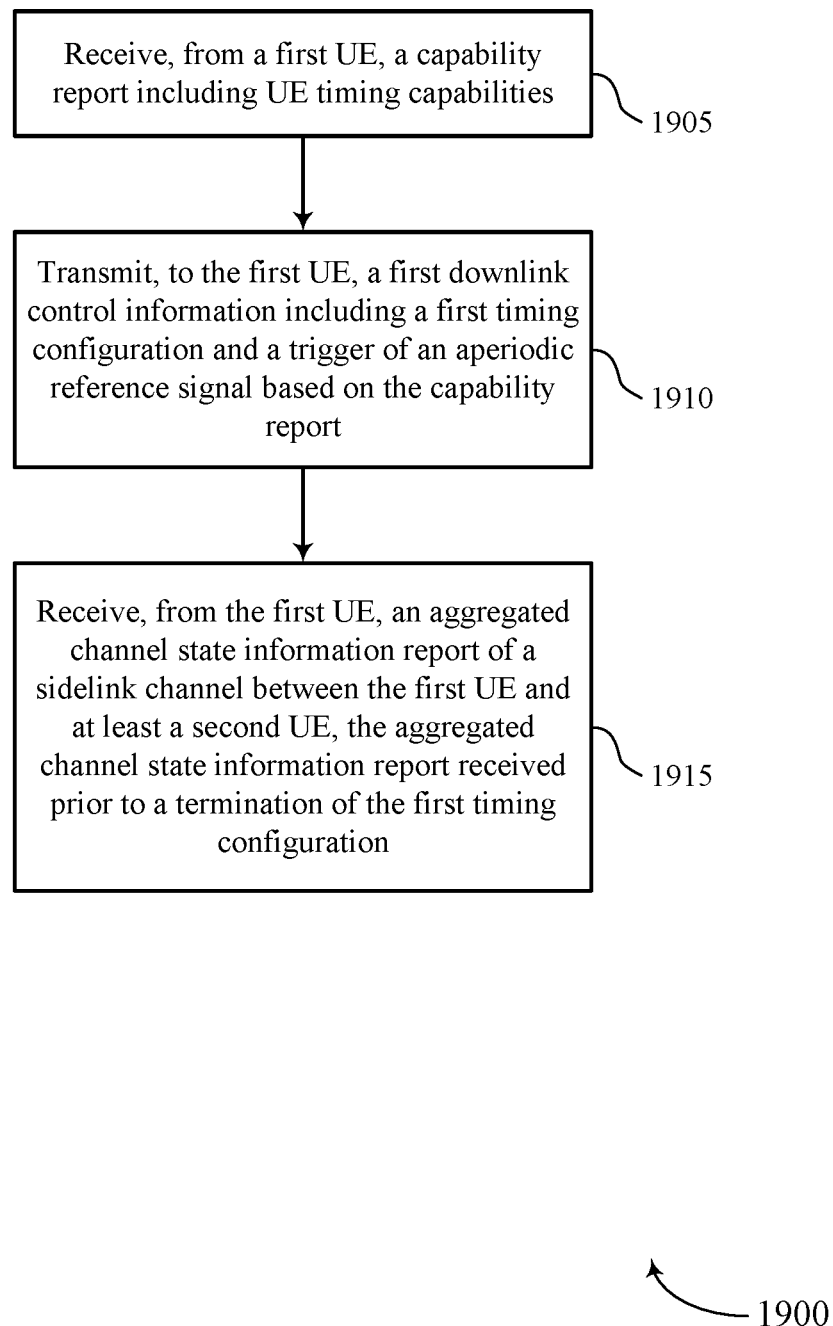

FIG. 19 shows a flowchart illustrating a method 1900 that supports timeline considerations for channel state information reporting of a sidelink channel in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1905, the base station may receive, from a first UE, a capability report including UE timing capabilities. The operations of 1905 may be performed according to the methods described herein. In some examples, aspects of the operations of 1905 may be performed by a Capability Report Component as described with reference to FIGS. 10 through 13.

At 1910, the base station may transmit, to the first UE, a first downlink control information including a first timing configuration and a trigger of an aperiodic reference signal based on the capability report. The operations of 1910 may be performed according to the methods described herein. In some examples, aspects of the operations of 1910 may be performed by a DCI Component as described with reference to FIGS. 10 through 13.

At 1915, the base station may receive, from the first UE, an aggregated channel state information report of a sidelink channel between the first UE and at least a second UE, the aggregated channel state information report received prior to a termination of the first timing configuration. The operations of 1915 may be performed according to the methods described herein. In some examples, aspects of the operations of 1915 may be performed by a Sidelink CSI Report Receiver as described with reference to FIGS. 10 through 13.

Figure 20:
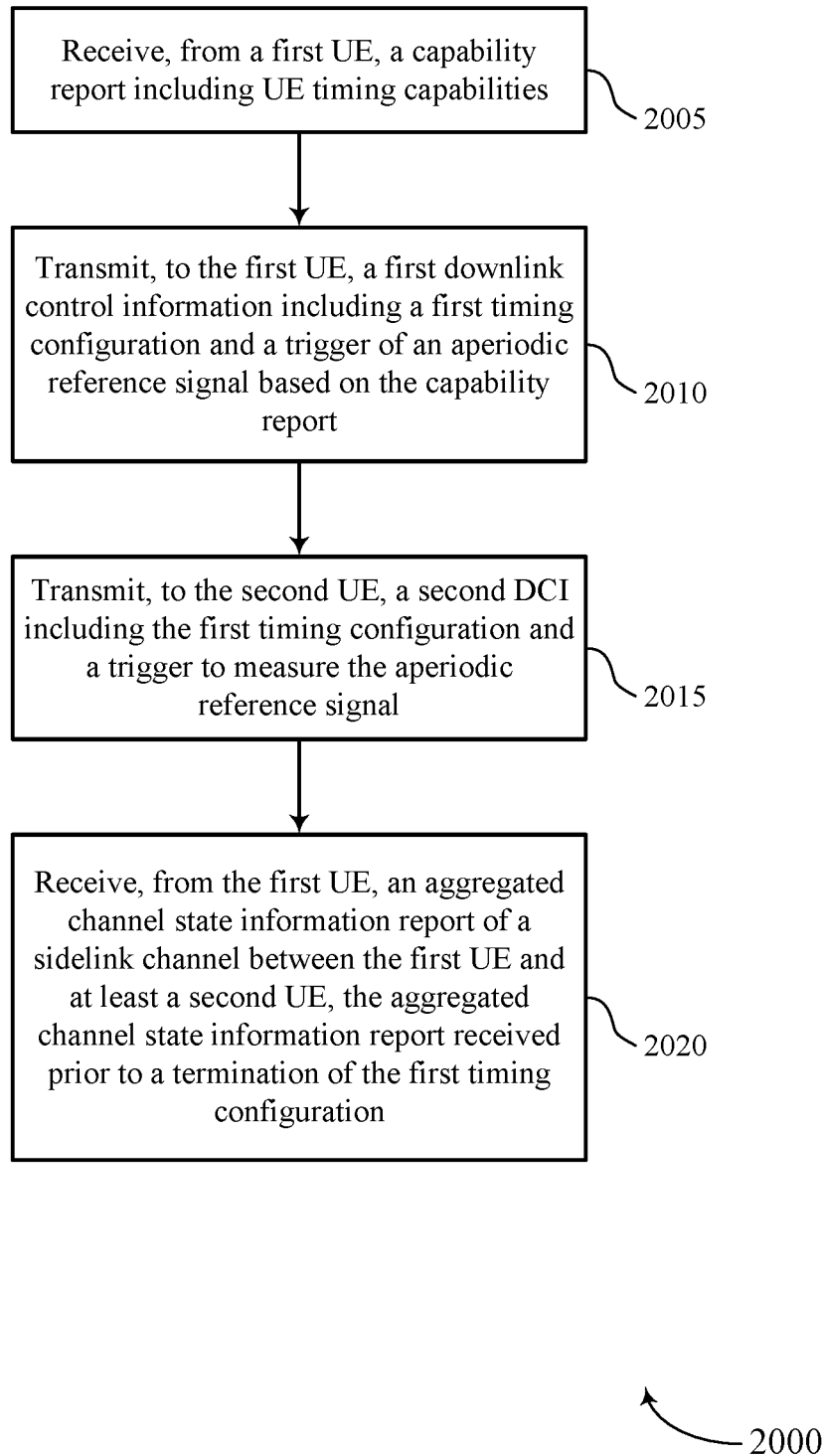

FIG. 20 shows a flowchart illustrating a method 2000 that supports timeline considerations for channel state information reporting of a sidelink channel in accordance with aspects of the present disclosure. The operations of method 2000 may be implemented by a base station 105 or its components as described herein. For example, the operations of method 2000 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 2005, the base station may receive, from a first UE, a capability report including UE timing capabilities. The operations of 2005 may be performed according to the methods described herein. In some examples, aspects of the operations of 2005 may be performed by a Capability Report Component as described with reference to FIGS. 10 through 13.

At 2010, the base station may transmit, to the first UE, a first downlink control information including a first timing configuration and a trigger of an aperiodic reference signal based on the capability report. The operations of 2010 may be performed according to the methods described herein. In some examples, aspects of the operations of 2010 may be performed by a DCI Component as described with reference to FIGS. 10 through 13.

At 2015, the base station may transmit, to the second UE, a second DCI including the first timing configuration and a trigger to measure the aperiodic reference signal. The operations of 2015 may be performed according to the methods described herein. In some examples, aspects of the operations of 2015 may be performed by a DCI Component as described with reference to FIGS. 10 through 13.

At 2020, the base station may receive, from the first UE, an aggregated channel state information report of a sidelink channel between the first UE and at least a second UE, the aggregated channel state information report received prior to a termination of the first timing configuration. The operations of 2020 may be performed according to the methods described herein. In some examples, aspects of the operations of 2020 may be performed by a Sidelink CSI Report Receiver as described with reference to FIGS. 10 through 13.

Figure 21:
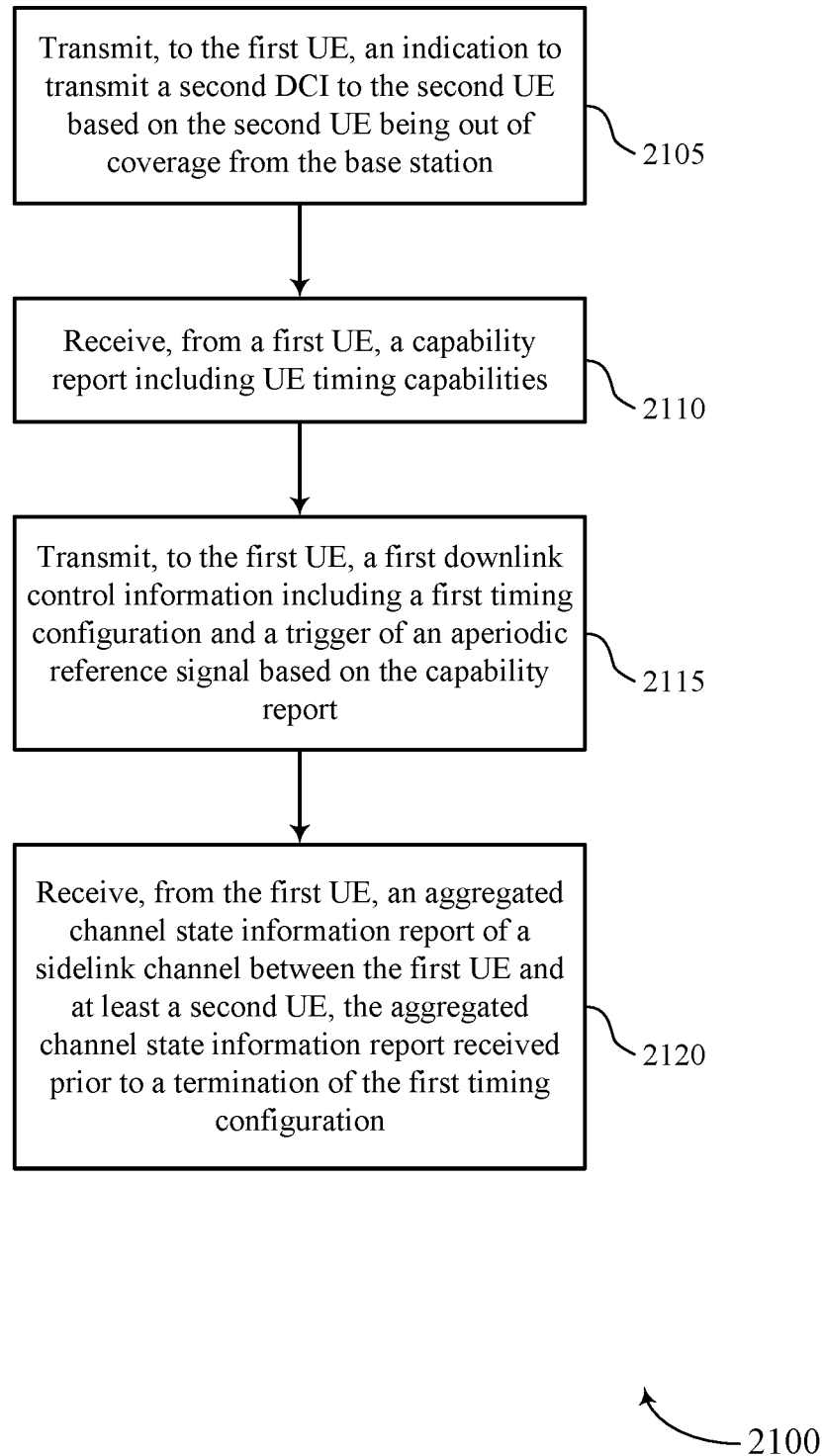

FIG. 21 shows a flowchart illustrating a method 2100 that supports timeline considerations for channel state information reporting of a sidelink channel in accordance with aspects of the present disclosure. The operations of method 2100 may be implemented by a base station 105 or its components as described herein. For example, the operations of method 2100 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 2105, the base station may transmit, to the first UE, an indication to transmit a second DCI to the second UE based on the second UE being out of coverage from the base station. The operations of 2105 may be performed according to the methods described herein. In some examples, aspects of the operations of 2105 may be performed by a Coverage Level Manager as described with reference to FIGS. 10 through 13.

At 2110, the base station may receive, from a first UE, a capability report including UE timing capabilities. The operations of 2110 may be performed according to the methods described herein. In some examples, aspects of the operations of 2110 may be performed by a Capability Report Component as described with reference to FIGS. 10 through 13.

At 2115, the base station may transmit, to the first UE, a first downlink control information including a first timing configuration and a trigger of an aperiodic reference signal based on the capability report. The operations of 2115 may be performed according to the methods described herein. In some examples, aspects of the operations of 2115 may be performed by a DCI Component as described with reference to FIGS. 10 through 13.

At 2120, the base station may receive, from the first UE, an aggregated channel state information report of a sidelink channel between the first UE and at least a second UE, the aggregated channel state information report received prior to a termination of the first timing configuration. The operations of 2120 may be performed according to the methods described herein. In some examples, aspects of the operations of 2120 may be performed by a Sidelink CSI Report Receiver as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Aspects of the following examples may be combined with any of the previous examples or aspects described herein. For instance, example 1 is a method for wireless communication at a first user equipment (UE) that includes: receiving, from a base station, a first timing configuration, receiving, from the base station, a first downlink control information comprising a trigger of an aperiodic reference signal based at least in part on a first timing configuration, transmitting, to at least a second UE, the aperiodic reference signal on a sidelink channel based at least in part on the trigger received in the first downlink control information, receiving, from the at least the second UE, one or more channel state information reports including channel state information parameters derived based at least in part on measurements of the aperiodic reference signal, aggregating the one or more channel state information reports during the first timing configuration, and transmitting, to the base station, the aggregated channel state information reports on an uplink channel prior to a termination of the first timing configuration.

In example 2, the method of example 1 may further include transmitting, to the base station, a capability report comprising UE timing capabilities, and refraining from transmitting the aggregated channel state information (CSI) reports when the first timing configuration is shorter than the reported UE timing capabilities.

In example 3, the method of any of examples 1-2 may include the refraining further including transmitting, to the base station, false aggregated CSI reports on the uplink channel prior to the termination of the first timing configuration when the first timing configuration is shorter than the reported UE timing capabilities, or dropping the aggregated CSI reports when the first timing configuration is shorter than the reported UE timing capabilities.

In example 4, the method of any of examples 1-3 may include the first timing configuration being based at least in part on a capability of the first UE and a capability of the second UE.

In example 5, the method of any of examples 1-4 may further include receiving the one or more channel state information (CSI) reports within a reception time window based at least in part on the received first downlink control information (DCI).

In example 6, the method of any of examples 1-5 may include the aggregating further including aggregating the one or more CSI reports received within the reception time window, dropping one or more CSI reports received after the termination of the reception time window, or transmitting, to the base station, false aggregated CSI reports on the uplink channel prior to the termination of the first timing configuration for the one or more CSI reports received after the termination of the reception time window.

In example 7, the method of any of examples 1-6 may include the first timing configuration defining a time period for the first UE to transmit the aggregated channel state information (CSI) reports with respect to when the first UE receives the one or more CSI reports.

In example 8, the method of any of examples 1-7 may include the first timing configuration defining a time period for the first UE to transmit the aggregated channel state information (CSI) reports with respect to when the first UE receives the first downlink control information (DCI).

In example 9, the method of any of examples 1-8 may include the first downlink control information (DCI) and the aperiodic reference signal being in a same slot, or the first DCI being in a first slot that occurs prior to a second slot including the aperiodic reference signal.

In example 10, the method of any of examples 1-9 may include the sidelink including a physical sidelink shared channel (PSSCH), and the uplink channel including the PSSCH, a physical uplink shared channel (PUSCH), a physical uplink control channel (PUCCH), or a physical sidelink feedback channel (PSFCH).

In example 11, the method of any of examples 1-10 may further include receiving, from the base station, an indication to transmit a second downlink control information (DCI) based at least in part on a coverage status of the second UE, and transmitting, to the second UE on the sidelink channel, the second DCI including a trigger to measure the aperiodic reference signal, where the second DCI is transmitted based at least in part on the received indication.

In example 12, the method of any of examples 1-11 may include the second UE being located out of coverage of the base station.

Example 13 is a method for wireless communications at a first user equipment (UE) that includes: transmitting, to the base station, a capability report including UE timing capabilities, receiving, from the base station, a first timing configuration, receiving, from the base station, a first downlink control information including a trigger to measure an aperiodic reference signal based at least in part on the first timing configuration, receiving, from a second UE, the aperiodic reference signal on a first sidelink channel based at least in part on the received first downlink control information, and transmitting, to the second UE on a second sidelink channel, a channel state information report prior to a termination of the first timing configuration.

In example 14, the method of example 13 may include the first timing configuration defining a time period for the second UE to transmit, to the base station, aggregated channel state information (CSI) reports with respect to when the second UE receives the CSI report.

In example 15, the method of any of examples 13-14 may include the first downlink control information (DCI) and the aperiodic reference signal being in a same slot, or the first DCI being in a first slot that occurs prior to a second slot including the aperiodic reference signal.

In example 16, the method of any of examples 13-15 may include the first sidelink channel including a physical sidelink shared channel (PSSCH), and the second sidelink channel including the PSSCH or a physical sidelink feedback channel (PSFCH).

Example 17 is a method for wireless communications at a first user equipment (UE) that includes: receiving, from a second UE on a first sidelink channel, a first timing configuration, receiving, from the second UE on the first sidelink channel, a first downlink channel information including a trigger to measure an aperiodic reference signal based at least in part on the first timing configuration, receiving, from the second UE, the aperiodic reference signal on a second sidelink channel based at least in part on the received first control information, and transmitting, to the second UE on a third sidelink channel, a channel state information report prior to a termination of the first timing configuration.

In example 18, the method of example 17 may include the first control information triggering the transmission of the channel state information (CSI) report to the second UE from a plurality of UEs.

In example 19, the method of any of examples 17-18 may include the first timing configuration defining a time period for the second UE to transmit, to the base station, aggregated channel state information (CSI) reports with respect to when the second UE receives the CSI report.

In example 20, the method of any of examples 17-19 may include the first control information and the aperiodic reference signal being in a same slot, or the first control information being in a first slot that occurs prior to a second slot including the aperiodic reference signal.

In example 21, the method of any of examples 17-20 may include the first sidelink channel including a physical sidelink shared channel (PSSCH), the second sidelink channel including the PSSCH or the PUSCH, and the third sidelink channel including the PSSCH or a physical sidelink feedback channel (PSFCH).

Example 22 is a method for wireless communications at a base station that includes: receiving, from a first user equipment (UE), a capability report including UE timing capabilities, transmitting, to the first UE, a first downlink control information including a first timing configuration and a trigger of an aperiodic reference signal based at least in part on the capability report, and receiving, from the first UE, an aggregated channel state information report of a sidelink channel between the first UE and at least a second UE, the aggregated channel state information report received prior to a termination of the first timing configuration.

In example 23, the method of example 22 may further include determining the first timing configuration based at least in part on a capability of the first UE and a capability of at least the second UE, where the aggregated channel state information (CSI) report includes one or more false CSI reports when the first timing configuration is shorter than the reported UE timing capabilities.

In example 24, the method of any of examples 22-23 may further include transmitting, to the second UE, a second downlink control information (DCI) including the first timing configuration and a trigger to measure the aperiodic reference signal.

In example 25, the method of any of examples 22-24 may include the first DCI being the same as the second DCI.

In example 26, the method of any of examples 22-25 may include the first DCI being different from the second DCI.

In example 27, the method of any of examples 22-26 may include the second DCI and the aperiodic reference signal being in a same slot, or the second DCI being in a first slot that occurs prior to a second slot including the aperiodic reference signal.

In example 28, the method of any of examples 22-27 may include the second UE being in a partial coverage mode with the base station.

In example 29, the method of any of examples 22-28 may further include transmitting, to the first UE, an indication to transmit a second downlink control information (DCI) to the second UE based at least in part on the second UE being out of coverage from the base station.

In example 30, the method of any of examples 22-29 may include the first timing configuration defining a time period for the first UE to transmit the aggregated channel state information (CSI) reports with respect to when the first UE receives the one or more CSI reports.

In example 31, the method of any of examples 22-30 may include the first timing configuration defining a time period for the first UE to transmit the aggregated channel state information (CSI) reports with respect to when the first UE receives the first downlink control information (DCI).

In example 32, the method of any of examples 22-31 may further include transmitting, to the first UE, a reception time window configuration associated with a time period for the first UE to receive one or more channel state information (CSI) reports with respect to when the first UE transmits the aperiodic reference signal.

In example 33, the method of any of examples 22-32 may include the sidelink channel including a physical sidelink shared channel (PSSCH) or a physical sidelink feedback channel (PSFCH).

Example 34 is a system or apparatus including means for implementing a method or realizing an apparatus as in any of examples 1-33.

Example 35 is a non-transitory computer-readable medium storing instructions executable by one or more processors to cause the one or more processors to implement a method as in any of examples 1-33.

Example 36 is a system including one or more processors and memory in electronic communication with the one or more processors storing instructions executable by the one or more processors to cause the system or apparatus to implement a method as in any of examples 1-33.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
receiving, from a second UE on a first sidelink channel, a first timing configuration, wherein the first UE and the second UE are different UEs;
receiving, from the second UE on the first sidelink channel, a first control information comprising a trigger to measure an aperiodic reference signal based at least in part on the first timing configuration, wherein the first control information is relayed from the second UE to the first UE based at least in part on the first UE being out of coverage with respect to a network device;
receiving, from the second UE, the aperiodic reference signal on a second sidelink channel based at least in part on the received first control information; and
transmitting, to the second UE on a third sidelink channel, a channel state information report (CSI) prior to a termination of the first timing configuration.

2. The method of claim 1, wherein the first control information triggers the transmission of the CSI report to the second UE from a plurality of UEs.

3. The method of claim 1, wherein the first control information and the aperiodic reference signal are in a same slot, or the first control information is in a first slot that occurs prior to a second slot comprising the aperiodic reference signal.

4. The method of claim 1, wherein the first sidelink channel comprises a physical sidelink shared channel (PSSCH), the second sidelink channel comprises the PSSCH or a physical uplink shared channel (PUSCH), and the third sidelink channel comprises the PSSCH or a physical sidelink feedback channel (PSFCH).

5. The method of claim 1, wherein the first timing configuration defines a time period for the second UE to transmit, to a network device, aggregated CSI reports with respect to when the second UE receives the CSI report.

6. A method for wireless communications at a first user equipment (UE), comprising:
transmitting, to a network device, a capability report comprising UE timing capabilities;
receiving, from the network device, a first timing configuration;
receiving, from the network device, a first downlink control information (DCI) comprising a trigger to measure an aperiodic reference signal based at least in part on the first timing configuration;
receiving, from a second UE, the aperiodic reference signal on a first sidelink channel based at least in part on the received first DCI, wherein the first UE and the second UE are different UEs; and
transmitting, to the second UE on a second sidelink channel, a channel state information (CSI) report prior to a termination of the first timing configuration, wherein the first timing configuration defines a time period for the second UE to transmit, to the network device, aggregated CSI reports with respect to when the second UE receives the CSI report, and wherein receiving the first DCI from the network device and transmitting the CSI report to the second UE is based at least in part on the first UE being in a partial coverage status with respect to the network device.

7. The method of claim 6, wherein the first DCI and the aperiodic reference signal are in a same slot, or the first DCI is in a first slot that occurs prior to a second slot comprising the aperiodic reference signal.

8. The method of claim 6, wherein the first sidelink channel comprises a physical sidelink shared channel (PSSCH), and the second sidelink channel comprises the PSSCH or a physical sidelink feedback channel (PSFCH).

9. A method for wireless communications at a first user equipment (UE), comprising:
transmitting, to a network device, a capability report comprising timing capabilities of the first UE;

receiving, from a network device, a first timing configuration, the timing configuration indicating a duration that is based at least in part on the timing capabilities of the first UE;

receiving, from the network device, a first downlink control information (DCI) comprising a trigger of an aperiodic reference signal based at least in part on a first timing configuration;

transmitting, to at least a second UE, the aperiodic reference signal on a sidelink channel based at least in part on the trigger received in the first DCI;

receiving, from at least the second UE, one or more channel state information (CSI) reports comprising CSI parameters derived based at least in part on measurements of the aperiodic reference signal;

aggregating the one or more CSI reports during the first timing configuration; and transmitting, to the network device, the aggregated CSI reports on an uplink channel prior to a termination of the first timing configuration.

10. The method of claim 9, further comprising:

transmitting, to the network device, a capability report comprising UE timing capabilities; and refraining from transmitting the aggregated CSI reports when the first timing configuration is shorter than the reported UE timing capabilities.

11. The method of claim 10, wherein the refraining further comprises:

transmitting, to the network device, false aggregated CSI reports on the uplink channel prior to the termination of the first timing configuration when the first timing configuration is shorter than the reported UE timing capabilities; or dropping the aggregated CSI reports when the first timing configuration is shorter than the reported UE timing capabilities.

12. The method of claim 10, wherein the first timing configuration is based at least in part on a capability of the first UE and a capability of the second UE.

13. The method of claim 9, further comprising:

receiving the one or more CSI reports within a reception time window based at least in part on the received first DCI.

14. The method of claim 13, wherein the aggregating further comprises:

aggregating the one or more CSI reports received within the reception time window;

dropping one or more CSI reports received after the termination of the reception time window; or transmitting, to the network device, false aggregated CSI reports on the uplink channel prior to the termination of the first timing configuration for the one or more CSI reports received after the termination of the reception time window.

15. The method of claim 9, wherein the first timing configuration defines a time period for the first UE to transmit the aggregated CSI reports with respect to when the first UE receives the one or more CSI reports.

16. The method of claim 9, wherein the first timing configuration defines a time period for the first UE to transmit the aggregated CSI reports with respect to when the first UE receives the first DCI.

17. The method of claim 9, wherein the first DCI and the aperiodic reference signal are in a same slot, or the first DCI is in a first slot that occurs prior to a second slot comprising the aperiodic reference signal.

18. The method of claim 9, wherein the sidelink channel comprises a physical sidelink shared channel (PSSCH), and the uplink channel comprises the PSSCH, a physical uplink shared channel (PUSCH), a physical uplink control channel (PUCCH), or a physical sidelink feedback channel (PSFCH).

19. The method of claim 9, further comprising:

receiving, from the network device, an indication to transmit a second DCI based at least in part on a coverage status of the second UE; and transmitting, to the second UE on the sidelink channel, the second DCI comprising a trigger to measure the aperiodic reference signal, wherein the second DCI is transmitted based at least in part on the received indication.

20. The method of claim 19, wherein the second UE is located out of coverage of the network device.

21. A method for wireless communications at a network device, comprising:

receiving, from a first user equipment (UE), a capability report comprising timing capabilities for the first UE and timing capabilities for at least a second UE;

transmitting, to the first UE, a first downlink control information (DCI) comprising a first timing configuration and a trigger of an aperiodic reference signal, the first timing configuration indicating a duration that is based at least in part on the timing capabilities for the first UE and the timing capabilities for the second UE; and receiving, from the first UE, an aggregated channel state information (CSI) report of a sidelink channel between the first UE and at least a second UE, the aggregated CSI report received prior to a termination of the first timing configuration.

22. The method of claim 21, further comprising:

determining the first timing configuration based at least in part on a capability of the first UE and a capability of at least the second UE, wherein the aggregated CSI report comprises one or more false CSI reports when the first timing configuration is shorter than the reported UE timing capabilities.

23. The method of claim 21, further comprising:

transmitting, to the second UE, a second DCI comprising the first timing configuration and a trigger to measure the aperiodic reference signal.

24. The method of claim 23, wherein the first DCI is the same as the second DCI.

25. The method of claim 23, wherein the first DCI is different from the second DCI.

26. The method of claim 23, wherein the second DCI and the aperiodic reference signal are in a same slot, or the second DCI is in a first slot that occurs prior to a second slot comprising the aperiodic reference signal.

27. The method of claim 21, further comprising:

transmitting, to the first UE, an indication to transmit a second DCI to the second UE based at least in part on the second UE being out of coverage from the network device.

28. The method of claim 21, wherein the first timing configuration defines a time period for the first UE to transmit the aggregated CSI reports with respect to when the first UE receives the one or more CSI reports.

29. The method of claim 21, wherein the first timing configuration defines a time period for the first UE to transmit the aggregated CSI reports with respect to when the first UE receives the first DCI.

* * * * *